US012785605B2

(12) United States Patent
Li et al.

(10) Patent No.: US 12,785,605 B2
(45) Date of Patent: Nov. 3, 2026

(54) MOTOR DRIVE SYSTEM, CHARGING METHOD AND VEHICLE

(71) Applicant: Huawei Digital Power Technologies Co., Ltd., Shenzhen (CN)

(72) Inventors: Ying Li, Xi'an (CN); Chaojie Shi, Dongguan (CN); Ningbo Feng, Xi'an (CN); Zhenxing Chen, Shenzhen (CN); Xian Luo, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 232 days.

(21) Appl. No.: 18/650,766

(22) Filed: Apr. 30, 2024

(65) Prior Publication Data

US 2024/0283385 A1 Aug. 22, 2024

Related U.S. Application Data

(63) Continuation of application No. PCT/CN2022/127667, filed on Oct. 26, 2022.

(30) Foreign Application Priority Data

Nov. 1, 2021 (CN) ......................... 202111283782.0

(51) Int. Cl.
*H02P 27/08* (2006.01)
*B60L 50/60* (2019.01)
(Continued)

(52) U.S. Cl.
CPC ............ *H02P 27/085* (2013.01); *B60L 50/60* (2019.02); *B60L 58/12* (2019.02); *H02J 7/2434* (2020.01); *H02P 27/12* (2013.01); *B60L 2240/12* (2013.01)

(58) Field of Classification Search
CPC ............... B60L 15/20; B60L 2240/423; B60L 2210/40; B60L 50/51; B60L 53/24;
(Continued)

(56) References Cited

U.S. PATENT DOCUMENTS

2007/0024219 A1* 2/2007 Aoyagi ..................... H02J 7/14 318/801
2021/0067069 A1* 3/2021 Iezawa ...................... H02P 6/28

FOREIGN PATENT DOCUMENTS

CN 111347901 A 6/2020
CN 112440782 A 3/2021
(Continued)

OTHER PUBLICATIONS

"Code for design of electric vehicle charging station and charging point," Q/CSG 11516.2-2010, Enterprise standard of China Southern Power Grid Co., LTD, total 43 pages (Apr. 19, 2010). With an English machine translation.

*Primary Examiner* — Antony M Paul
(74) *Attorney, Agent, or Firm* — Leydig, Voit & Mayer, Ltd.

(57) ABSTRACT

This application provides a motor drive system, a vehicle, a charging method, a control apparatus, and a medium, to improve motor performance in a vehicle charging process. The motor drive system may include a plurality of bridge arms, a motor, and a control module. The motor includes a plurality of windings. A second end of a first switch in a first bridge arm in the plurality of bridge arms is coupled to a first electrode of a power supply, and a second electrode of the power supply is coupled to a power battery. The control module is configured to: obtain a rotor position angle of the motor; and control a bridge arm other than the first bridge arm in the plurality of bridge arms in a control manner
(Continued)

corresponding to the rotor position angle, to enable the power supply to charge the power battery.

15 Claims, 8 Drawing Sheets

(51) Int. Cl.

| | |
|---|---|
| ***B60L 58/12*** | (2019.01) |
| ***H02J 7/24*** | (2006.01) |
| ***H02P 27/12*** | (2006.01) |

(58) Field of Classification Search

CPC ...... B60L 58/10; B60L 2240/429; B60L 7/14; B60L 50/66; B60L 50/60; B60L 2210/10; B60L 2220/14; B60L 2220/54; B60L 2240/545; B60L 53/11; B60L 2210/14; B60L 2240/486; B60L 3/0046; B60L 2240/36; B60L 55/00; B60L 2240/427; B60L 2240/425; B60L 2240/529; B60L 50/40; B60L 2220/16; B60L 2240/42; B60L 3/0084; B60L 2210/30; B60L 53/20; B60L 3/003; B60L 58/40; B60L 15/00; B60L 2240/443; B60L 2240/547; B60L 2240/526; B60L 2240/54; B60L 15/32; B60L 2240/463; B60L 2240/549; B60L 2260/22; B60L 2210/42; B60L 2240/445; B60L 2240/525; B60L 2210/44; B60L 53/62; B60L 58/22; B60L 53/53; B60L 2220/12; B60L 2210/46; B60L 53/00; B60L 2260/28; B60L 3/0061; B60L 50/61; H02K 11/33; H02K 3/28; H02K 11/21; H02K 11/049; H02K 29/06; H02K 47/04; H02P 27/08; H02P 27/06; H02P 6/16; H02P 21/22; H02P 29/40; H02P 6/08; H02P 2101/45; H02P 6/14; H02P 2201/09; H02P 23/00; H02P 21/14; H02P 21/18; H02P 2207/05; H02P 25/22; H02P 25/03; H02P 6/085; H02P 9/302; H02P 6/20; H02P 9/009; H02P 6/04; H02P 2205/05; H02P 7/28; H02P 25/026; H02P 2006/045; H02P 21/20; H02P 7/293; H02P 21/32; H02P 21/30; H02P 25/022; H02P 6/153; H02P 2207/03; H02P 3/14; H02M 7/5387; H02M 7/5395; H02M 7/219; H02M 3/1552; H02M 3/3353; H02M 1/0054; H02M 1/4233; H02M 3/335; H02M 3/1582; B62D 5/046

See application file for complete search history.

(56) References Cited

FOREIGN PATENT DOCUMENTS

| | | | |
|---|---|---|---|
| CN | 113043870 | A | 6/2021 |
| CN | 113285648 | A | 8/2021 |
| CN | 114211981 | A | 3/2022 |
| EP | 3081429 | A1 | 10/2016 |
| JP | H08186907 | A | 7/1996 |
| JP | 2007037275 | A | 2/2007 |
| JP | 2009005531 | A | 1/2009 |

* cited by examiner

MOTOR DRIVE SYSTEM, CHARGING METHOD AND VEHICLE

CROSS-REFERENCE TO RELATED APPLICATIONS

This application is a continuation of International Application No. PCT/CN2022/127667, filed on Oct. 26, 2022, which claims priority to Chinese Patent Application No. 202111283782.0, filed on Nov. 1, 2021. The disclosures of the aforementioned applications are hereby incorporated by reference in their entireties.

TECHNICAL FIELD

This application relates to the field of charging technologies, and in particular, to a motor drive system, a charging method and a vehicle.

BACKGROUND

Generally, there are two output specifications of charging piles: 200 V to 500 V and 200 V to 750 V. If a voltage of a power battery of an electric vehicle is greater than an output voltage of a charging pile, the power battery cannot be fast charged. For example, if the voltage of the power battery is 500 V to 750 V, the power battery cannot be fast charged through a charging pile whose output voltage is 200 V to 500 V.

To fast charge the power battery, the first solution is to add a boost circuit to the electric vehicle, to perform boost processing on a voltage provided by the charging pile, and provide a voltage obtained through the boost processing to the power battery, to implement boost charging on the power battery. This increases costs, a weight, and a size of the electric vehicle.

The second solution is to reuse a motor. Boost processing is performed, by reusing a coil in the motor, on a voltage provided by the charging pile. The motor is an important apparatus in the electric vehicle, and motor performance affects a running state of the vehicle. Currently, a solution for improving motor performance is urgently needed in a vehicle parking and charging process.

SUMMARY

This application provides a motor drive system, a vehicle, a charging method, a control apparatus, and a medium, to improve motor performance in a vehicle charging process, for example, reduce a wheel-end torque or reduce heat generated by a motor during charging.

According to a first aspect, this application provides a motor drive system. The motor drive system may include a plurality of bridge arms, a motor, and a control module. Each of the plurality of bridge arms includes a first switch and a second switch, a first end of the first switch is coupled to a first electrode of a power battery, a second end of the first switch is coupled to a first end of the second switch, and a second end of the second switch is coupled to a second electrode of the power battery. The motor includes a plurality of windings, the plurality of windings are in one-to-one correspondence with the plurality of bridge arms, a first end of each of the plurality of windings is coupled to a common endpoint, and a second end of the winding is coupled to a second end of a first switch in a corresponding bridge arm. A second end of a first switch in a first bridge arm in the plurality of bridge arms is coupled to a first electrode of a power supply, and a second electrode of the power supply is coupled to the power battery. The control module is configured to: obtain a rotor position angle of the motor; and control a bridge arm other than the first bridge arm in the plurality of bridge arms in a control manner corresponding to the rotor position angle, to enable the power supply to charge the power battery.

In this embodiment of this application, the control module may charge the power battery by controlling the bridge arm coupled to the motor and reusing the winding in the motor. In addition, the control module controls the motor in the control manner corresponding to the rotor position angle of the motor. In this way, motor performance in a process of charging the power battery can be improved. For example, a motor loss (for example, a magnetic steel loss) is reduced, to reduce a thermal risk of the motor or reduce an output torque of the motor. During motor control, zero degrees of one phase in three-phase coordinate system are generally used as a reference, and both the rotor position angle and a stator vector are measured based on the reference. For example, in FIG. 1, a winding S1 in a motor 10 may be denoted as a U-phase winding, a winding S2 may be denoted as a W-phase winding, and a winding S3 may be denoted as a V-phase winding. For ease of description, in this application, zero degrees of a U phase in a plurality of phases of the motor may be used as a reference for the rotor position angle and a stator magnetic field vector (also referred to as the stator vector).

In a possible design, the control manner corresponding to the rotor position angle is determined based on a preset relationship between a position angle set and a control manner, the relationship between a position angle set and a control manner includes a correspondence between different position angle sets and different control manners, and each position angle set includes one or more position angles.

In this embodiment of this application, the control module may determine, based on the preset relationship between a position angle set and a control manner, the control manner corresponding to the obtained rotor position angle. The control module may pre-obtain or store the position angle set and the control manner. Control manners corresponding to different position angle sets may be the same or different. Each position angle set may include one or more position angles. The control module may control the bridge arm in the motor in a control manner corresponding to a position angle set to which the obtained rotor position angle of the motor belongs. It can be learned that different rotor position angles of the motor may correspond to different control manners, and the control module may control, in a plurality of control manners, the bridge arm connected to the motor. The motor performance varies with the control manner of the motor. The control module can control the bridge arm in different control manners, to improve the motor performance. For example, the magnetic steel loss of the motor is reduced, and the torque of the motor is reduced.

In a possible design, the control manner includes one of a parallel in-phase control manner, a parallel interleaved control manner, and a series control manner. When controlling the switches in the plurality of bridge arms, the control module is specifically configured to: control main switches in two bridge arms other than the first bridge arm in the plurality of bridge arms to be periodically in a turn-on state at a same turn-on start moment and a same turn-on end moment if the control manner corresponding to the rotor position angle is the parallel in-phase control manner; or control main switches in two bridge arms other than the first bridge arm in the plurality of bridge arms to be periodically in a turn-on state at different turn-on start moments and/or different turn-on end moments if the control manner corresponding to the rotor position angle is the parallel interleaved control manner; or control a main switch in any bridge arm other than the first bridge arm in the plurality of bridge arms to be periodically in a turn-on state if the control manner corresponding to the rotor position angle is the series control manner. If the second electrode of the power supply is coupled to the first electrode of the power battery, the main switch is the first switch; or if the second electrode of the power supply is coupled to the second electrode of the power battery, the main switch is the second switch.

In this embodiment of this application, the power battery is charged, and the control module may control the motor in the control manner corresponding to the rotor position angle of the motor. Different rotor position angles of the motor may correspond to different control manners, and the control module may control, in a plurality of control manners, the bridge arm connected to the motor. The motor performance varies with the control manner of the motor. The control module can control the bridge arm in different control manners, to improve the motor performance. For example, the magnetic steel loss of the motor is reduced, and the torque of the motor is reduced.

In a possible design, if the control manner corresponding to the position angle set to which the rotor position angle belongs is the parallel interleaved control manner, the control module is further configured to adjust turn-on duration of a main switch in at least one of the two bridge arms, to change a current proportion in windings that are separately coupled to the two bridge arms.

In this embodiment of this application, when the control module uses the parallel interleaved control manner, the control module may not only control the main switches in the two bridge arms other than the one bridge arm in the plurality of bridge arms to be periodically in the turn-on state at the same turn-on start moment and the same turn-on end moment, but also change the turn-on duration of the at least one main switch in the two bridge arms, to change the current proportion in the windings connected to the two bridge arms. Because the stator vector may be adjusted by adjusting the current proportion in the windings connected to the two bridge arms, in the process of charging the power battery, a change in a stator vector angle may cause a change in a relative angle between the stator vector and the rotor position angle and a change in the output torque of the motor and the rotor position angle. Therefore, a control manner may be re-determined based on a changed rotor position angle, and the control module may re-obtain the rotor position angle of the motor, and control the bridge arm in a control manner corresponding to a position angle set to which the last obtained rotor position angle of the motor belongs, to increase a controllable range of the motor performance.

In a possible design, the relationship between a position angle set and a control manner is determined based on at least one of the following: a torque of the motor obtained when the control module controls a bridge arm other than the first bridge arm in the plurality of bridge arms in each of the different control manners in any position angle in the position angle set; or a loss of the motor obtained when the control module controls a bridge arm other than the first bridge arm in the plurality of bridge arms in each of the different control manners in any position angle in the position angle set.

In this embodiment of this application, the motor loss generally includes the magnetic steel loss, a hysteresis loss, and the like. An excessively high motor loss may cause an excessively high thermal risk of the motor. The position angle set and the control manner may be determined based on a relationship between a rotor position angle and a magnetic steel loss of the motor that are obtained when the control module controls the bridge arm of the motor in each control manner, for example, based on a loss of the motor at any position angle in each position angle set; and/or determined based on a relationship between a rotor position angle and a torque of the motor, for example, based on a torque of the motor at any one of position angles. Based on such a design, the control module can use the control manner corresponding to the obtained rotor position angle, so that the motor loss is reduced or the torque of the motor is reduced. For example, after obtaining the rotor position angle, the control module may perform control in the control manner corresponding to the position angle set to which the obtained rotor position angle belongs, so that the motor performance is controllable in the process of charging the power battery.

In a possible design, before obtaining the rotor position angle of the motor, the control module may further determine that a vehicle to which the motor drive system belongs is in a stop state or a parking state. In this embodiment of this application, before the power battery is charged, it may be determined that the vehicle is in the stop state or the parking state. When the vehicle is in the stop state or the parking state, the power battery is charged by reusing the motor in the vehicle, so that the motor performance can be improved.

In a possible design, after the control module controls the bridge arm in the control manner corresponding to the rotor position angle, that is, the control module controls the motor to start charging the power battery, the motor generates a torque, that is, the output torque of the motor changes. In this case, the torque generated by the motor may cause a change in the rotor position angle of the motor. The rotor position angle of the motor generally changes in a gear gap in a transmission device, for example, a shaft or a gear, between a wheel end and a motor end of the vehicle to which the motor drive system belongs. The control module may obtain the rotor position angle of the motor in real time, and control the bridge arm in the control manner corresponding to the last obtained rotor position angle of the motor, to improve the motor performance.

According to a second aspect, this application provides a charging method. The method may be applied to a motor drive system. The motor drive system includes a plurality of bridge arms and a motor. Each of the plurality of bridge arms includes a first switch and a second switch, a first end of the first switch is coupled to a first electrode of a power battery, a second end of the first switch is coupled to a first end of the second switch, and a second end of the second switch is coupled to a second electrode of the power battery. The motor includes a plurality of windings, the plurality of windings are in one-to-one correspondence with the plurality of bridge arms, a first end of each of the plurality of windings is coupled to a common endpoint, and a second end of the winding is coupled to a second end of a first switch in a corresponding bridge arm. A second end of a first switch in a first bridge arm in the plurality of bridge arms is coupled to a first electrode of a power supply, and a second electrode of the power supply is coupled to the power battery. The method includes: obtaining a rotor position angle of the motor; and controlling a bridge arm other than the first bridge arm in the plurality of bridge arms in a control manner corresponding to the rotor position angle, to enable the power supply to charge the power battery.

In a possible design, the control manner includes one of a parallel in-phase control manner, a parallel interleaved control manner, and a series control manner. The controlling a bridge arm other than the one bridge arm in the plurality of bridge arms includes: controlling main switches in two bridge arms other than the one bridge arm in the plurality of bridge arms to be periodically in a turn-on state at a same turn-on start moment and a same turn-on end moment if the control manner corresponding to the rotor position angle is the parallel in-phase control manner; or controlling main switches in two bridge arms other than the one bridge arm in the plurality of bridge arms to be periodically in a turn-on state at different turn-on start moments and/or different turn-on end moments if the control manner corresponding to the rotor position angle is the parallel interleaved control manner; or controlling a main switch in any bridge arm other than the one bridge arm in the plurality of bridge arms to be periodically in a turn-on state if the control manner corresponding to the rotor position angle is the series control manner. If the second electrode of the power supply is coupled to the first electrode of the power battery, the main switch is the first switch; or if the second electrode of the power supply is coupled to the second electrode of the power battery, the main switch is the second switch.

In a possible design, the controlling main switches in two bridge arms other than the first bridge arm in the plurality of bridge arms to be periodically in a turn-on state at different turn-on start moments and/or different turn-on end moments if the control manner corresponding to the rotor position angle of the motor is the parallel interleaved control manner further includes: adjusting turn-on duration of a main switch in at least one of the two bridge arms, to change a current proportion in windings that are separately coupled to the two bridge arms.

In a possible design, the control manner corresponding to the rotor position angle is determined based on a preset relationship between a position angle set and a control manner, the relationship between a position angle set and a control manner includes a correspondence between different position angle sets and different control manners, and each position angle set includes one or more position angles.

In a possible design, the relationship between a position angle set and a control manner is determined based on at least one of the following: a torque of the motor obtained when a bridge arm other than the first bridge arm in the plurality of bridge arms is controlled in each of the different control manners in any position angle in the position angle set; or a loss of the motor obtained when a bridge arm other than the first bridge arm in the plurality of bridge arms is controlled in each of the different control manners in any position angle in the position angle set.

In a possible design, before the obtaining a rotor position angle of the motor, the method further includes: determining that a vehicle to which the motor drive system belongs is in a stop state or a parking state.

In a possible design, after the controlling a bridge arm other than the one bridge arm in the plurality of bridge arms, the method further includes: re-obtaining a rotor position angle of the motor; and controlling, based on the relationship between a position angle set and a control manner and the re-obtained rotor position angle, the bridge arm other than the one bridge arm in the plurality of bridge arms in a control manner corresponding to a position angle set to which the re-obtained rotor position angle belongs.

According to a third aspect, this application provides a control apparatus, including a memory and a processor. The memory stores computer instructions, and the processor reads the computer instructions to perform the method according to any one of the designs of the second aspect.

According to a fourth aspect, this application provides a computer-readable storage product, storing computer instructions. When the computer instructions are executed by a control apparatus, the control apparatus is enabled to perform the method according to any one of the designs of the second aspect.

According to a fifth aspect, this application provides an electric vehicle, including the motor drive system according to any one of the designs of the first aspect.

For a technical effect that can be achieved by any one of the possible designs of any one of the second aspect to the fifth aspect, refer to the technical effect that can be achieved by any one of the possible designs of the first aspect. Details are not described herein again.

DESCRIPTION OF EMBODIMENTS

Figure 1:
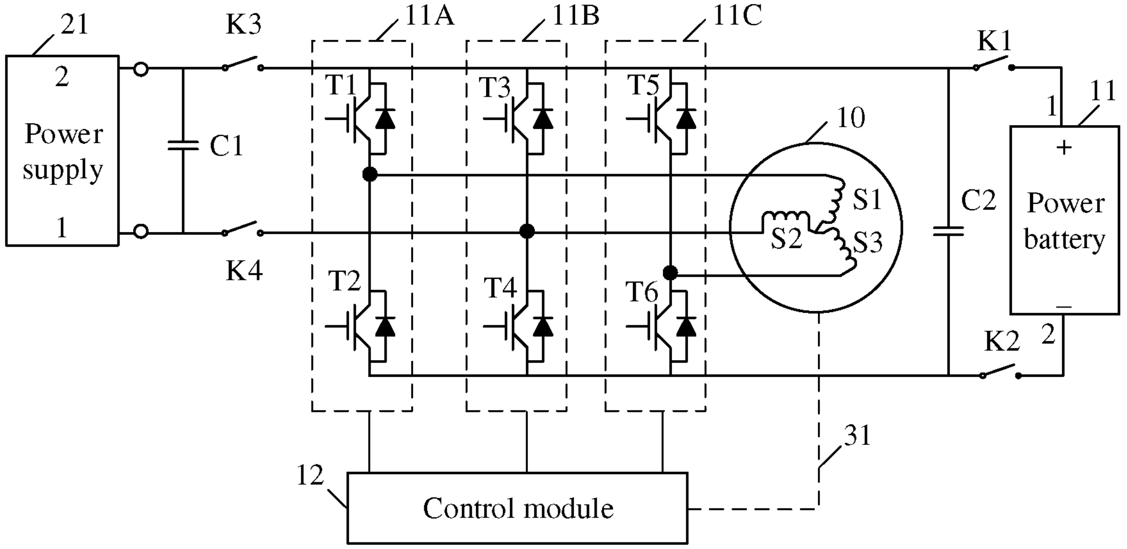
FIG. 1 is a schematic diagram of a structure of a motor drive system according to an embodiment of this application.

Terms used in the following embodiments are merely intended to describe particular embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly.

Reference to "one embodiment", "some embodiments", or the like described in this specification means that one or more embodiments of this application include specific features, structures, or characteristics described with reference to embodiments. Therefore, in this specification, statements, such as "in an embodiment", "in some embodiments", "in some other embodiments", and "in other embodiments", that appear at different places in this specification do not necessarily mean reference to a same embodiment, instead, they mean "one or more but not all of the embodiments", unless otherwise specifically emphasized. The terms "include", "comprise", "have", and their variants all mean "include but are not limited to", unless otherwise specifically emphasized.

To make the objectives, the technical solutions, and advantages of this application clearer, the following further describes this application in detail with reference to the accompanying drawings. For ease of understanding of a connector provided in embodiments of this application, the following first describes an application scenario of the connector.

Generally, there are two output specifications of charging piles: 200 V to 500 V and 200 V to 750 V. If a voltage of a power battery of an electric vehicle is greater than an output voltage of a charging pile, the power battery cannot be fast charged. For example, if the voltage of the power battery is 500 V to 750 V, the power battery cannot be fast charged through a charging pile whose output voltage is 200 V to 500 V.

To fast charge the power battery, the first solution is to add a boost circuit to the electric vehicle, to perform boost processing on a voltage provided by the charging pile, and provide a voltage obtained through the boost processing to the power battery, so as to implement boost charging on the power battery. However, this solution increases costs, a weight, and a size of the electric vehicle.

The second solution is to reuse a motor. Boost processing is implemented on a voltage provided by the charging pile by reusing a coil in the motor. Because the motor is a main driving part in the electric vehicle, motor performance has important impact on running or safety of the vehicle. The motor performance may generally include a motor output torque, a motor loss (a magnetic steel loss of the motor or a hysteresis loss), and the like. The magnetic steel loss of the motor and the like may cause a thermal risk of the motor. In this application, the magnetic steel loss of the motor is used as an example for description. For example, in a process in which the vehicle is parked and charged, and the motor is reused to perform boost processing, if the output torque of the motor is not controlled, the vehicle may move, and there is a high safety risk. For another example, in a process in which the vehicle is parked and charged, and the motor is reused to perform boost processing, if the motor loss is not controlled, an excessively high motor temperature may occur, causing damage to a motor element, or easily causing a risk such as overheat and demagnetization of the motor or a winding insulation failure.

In view of this, this application provides a motor drive system. The motor drive system may be used for an electric vehicle, so that motor performance can be maintained in a specific range in a process in which the electric vehicle is parked or stopped and charged, to improve the motor performance, and reduce a motor charging torque and a motor thermal risk.

In embodiments of this application, the electric vehicle may be a pure electric power-driven vehicle, or may be a hybrid power-driven vehicle. As shown in FIG. 1, the motor drive system may include a plurality of bridge arms and a motor 10.

For ease of description, FIG. 1 shows three bridge arms: a bridge arm 11A, a bridge arm 11B, and a bridge arm 11C. A quantity of bridge arms in the motor drive system may alternatively be greater than 3, for example, 4, 5, or 6. Each of the plurality of bridge arms may include a first switch and a second switch that are connected in series. A first end of the first switch is coupled to a first electrode of a power battery 11 (for example, an anode (positive (+) terminal) of the power battery 11), a second end of the first switch is coupled to a first end of the second switch, and a second end of the second switch is coupled to a second electrode of the power battery 11 (for example, a cathode (negative (−) terminal) of the power battery 11).-

For example, the bridge arm 11A may include a switch T1 and a switch T2 that are connected in series. A first end of the switch T1 is coupled to the first electrode of the power battery 11, a second end of the switch T1 is coupled to a first end of the switch T2, and a second end of the switch T2 is coupled to the second electrode of the power battery 11. The bridge arm 11B may include a switch T3 and a switch T4 that are connected in series. A first end of the switch T3 is coupled to the first electrode of the power battery 11, a second end of the switch T3 is coupled to a first end of the switch T4, and a second end of the switch T4 is coupled to the second electrode of the power battery 11. The bridge arm 11C may include a switch T5 and a switch T6 that are connected in series. A first end of the switch T5 is coupled to the first electrode of the power battery 11, a second end of the switch T5 is coupled to a first end of the switch T6, and a second end of the switch T6 is coupled to the second electrode of the power battery 11. In each bridge arm, a switch coupled to the first electrode of the power battery 11 may be denoted as the first switch in the bridge arm. For example, the first switch in the bridge arm 11A is the switch T1, the first switch in the bridge arm 11B is the switch T3, and the first switch in the bridge arm 11C is the switch T5. In each bridge arm, a switch coupled to the second electrode of the power battery 11 may be denoted as the second switch in the bridge arm. For example, the second switch in the bridge arm 11A is the switch T2, the second switch in the bridge arm 11B is the switch T4, and the second switch in the bridge arm 11C is the switch T6.

In this embodiment of this application, the switch in each bridge arm includes, for example, an insulated gate bipolar transistor (IGBT) and a diode. In each switch, the diode is connected in parallel to the IGBT. An anode of the diode is connected to a second end of the IGBT, and a cathode of the diode is connected to a first end of the IGBT. Alternatively, the switch in each bridge arm is a switching transistor that may include a body diode, for example, a silicon carbide (SIC) transistor.

The motor 10 may include a plurality of windings, and the plurality of windings may be in one-to-one correspondence with the plurality of bridge arms. It can be learned that, in this embodiment of this application, the motor may alternatively be a three-phase motor a multiphase motor with more than three phases. Optionally, the motor drive system may include a plurality of motors. In a process of charging the power battery, one of the plurality of motors may be implemented as the motor 10.

As shown in FIG. 1, the motor 10 may include a first winding S1 (which may also be denoted as a U-phase winding), a second winding S2 (which may also be denoted as a W-phase winding), and a third winding S3 (which may also be denoted as a V-phase winding). A first end of each winding in the motor is coupled to a common end P, and a second end of each winding is coupled to a second end of a first switch in a corresponding bridge arm. For example, the first winding S1 may correspond to the bridge arm 11A, and is coupled to the second end of the switch T1 in the bridge arm 11A; in other words, a second end of the first winding S1 is coupled to a midpoint of the bridge arm 11A, i.e., a midpoint between switch T1 and switch T2, which is not drawn to scale in the schematic wiring diagram in FIG. 1 for visual clarity. Similarly, the second winding S2 may correspond to the bridge arm 11B, and is coupled to the second end of the switch T3 in the bridge arm 11B (in other words, coupled to a midpoint of the bridge arm 11B, i.e., a midpoint between switch T3 and switch T5, which is not drawn to scale in the schematic wiring diagram in FIG. 1 for visual clarity); the third winding S3 may correspond to the bridge arm 11C, and is coupled to the second end of the switch T5 in the bridge arm 11C (in other words, coupled to a midpoint of the bridge arm 11C, i.e., a midpoint between switch T5 and switch T6, which is not drawn to scale in the schematic wiring diagram in FIG. 1 for visual clarity).

The motor drive system may be coupled to a power supply 21, a first electrode of the power supply 21 may be coupled to a midpoint of a first bridge arm, and the first bridge arm may be coupled to any one of the plurality of bridge arms at a midpoint. In this application, when controlling the motor to charge the power battery 11, a control module 12 may control a bridge arm other than the first bridge arm in the motor, so that the power battery 11 is charged by reusing the motor. For ease of description, the following uses the bridge arm 11B as the first bridge arm for description. As shown in FIG. 1, the first electrode of the power supply 21 may be coupled to the second end of the switch T3 in the bridge arm 11B. Alternatively, the first electrode of the power supply 21 is coupled to the second end of the switch T1 in the bridge arm 11A. Alternatively, the first electrode of the power supply 21 is coupled to the second end of the switch T5 in the bridge arm 11C. In this embodiment of this application, the power supply 21 may be a charging pile or another external power supply. A voltage provided by the power supply 21 is less than a charging voltage required by the power battery 11.

Figure 2:
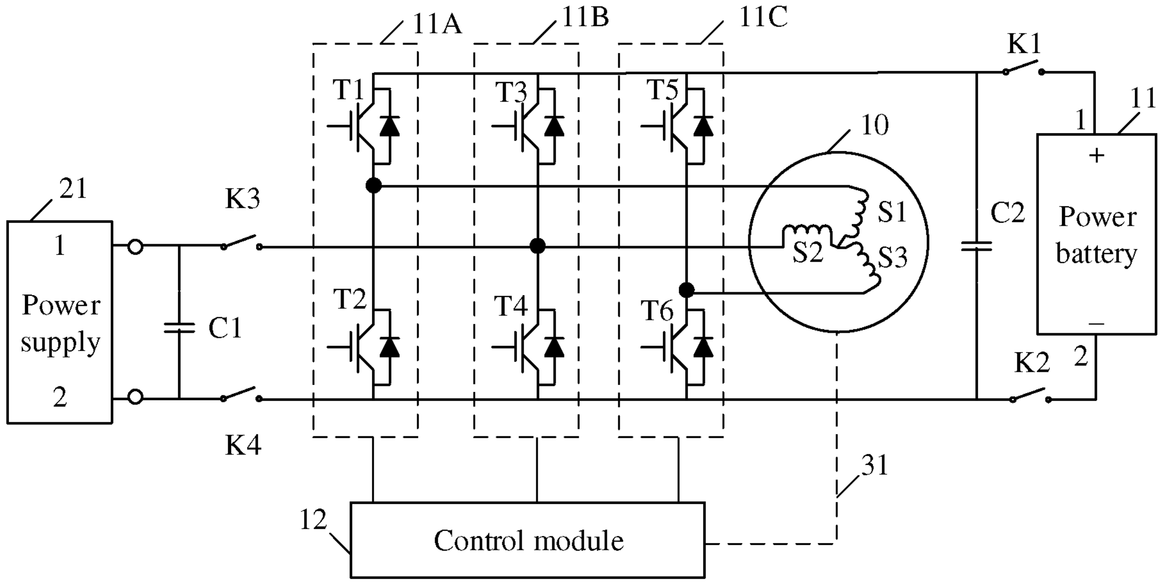
FIG. 2 is a schematic diagram of another structure of a motor drive system according to an embodiment of this application.

A second electrode of the power supply 21 may be coupled to the power battery 11. In an example, as shown in FIG. 1, the second electrode of the power supply 21 may be coupled to the first electrode of the power battery 11 (for example, the anode (positive (+) terminal) of the power battery 11). In this case, the first switch in each bridge arm may be referred to as a main switch in the bridge arm. In another example, as shown in FIG. 2, the second electrode of the power supply 21 may be coupled to the second electrode of the power battery 11 (for example, the cathode (negative (−) terminal) of the power battery 11). In this case, the second switch in each bridge arm may be referred to as a main switch in the bridge arm.

Still refer to FIG. 1. Generally, the motor drive system may include a switch K1 and a switch K2. The first switch in each bridge arm may be coupled to the first electrode of the power battery 11 by using the switch K1. The second switch in each bridge arm may be coupled to the second electrode of the power battery 11 by using the switch K2. When the motor drive system charges the power battery 11, both the switch K1 and the switch K2 may be in a turn-on state, to form a charging loop.

The motor drive system may further include a switch K3 and a switch K4. The first switch in each bridge arm is coupled to the power supply 21 by using the switch K3. The second switch in each bridge arm may be coupled to the second electrode of the power battery 11 by using the switch K4. When the motor drive system charges the power battery 11, both the switch K3 and the switch K4 may be in the turn-on state, so that electric energy provided by the power supply 21 is transmitted to the motor drive system.

The motor drive system may include a capacitor C1. One end of the capacitor C1 is connected to the switch K3, and the other end is connected to the switch K4, to filter the electric energy output by the power supply 21. The motor drive system may further include a capacitor C2. One end of the capacitor C2 is connected to the switch K1, and the other end is connected to the switch K4, to filter the electric energy output by the motor drive system.

The motor drive system may include the control module 12. The control module 12 may include a control apparatus. Alternatively, the control module 12 includes one or more controllers. The control module 12 may control the main switch in each bridge arm. When the voltage provided by the power supply 21 is lower than the charging voltage of the power battery 11, the control module 12 may control a main switch in one or two bridge arms, so that the winding in the motor and the bridge arm form a boost circuit. For example, as shown in FIG. 1, the power supply 21 is coupled to the second end of the first switch in the bridge arm 11B in the plurality of bridge arms, and the control module 12 may control a main switch in a bridge arm other than the bridge arm 11B in the plurality of bridge arms. For example, the control module 12 may control the main switches in the bridge arm 11A and the bridge arm 11C, or control the main switch in the bridge arm 11A, or control the bridge arm 11C.

For another example, the power supply 21 is coupled to the second end of the first switch in the bridge arm 11A in the plurality of bridge arms, and the control module 12 may control a main switch in a bridge arm other than the bridge arm 11A in the plurality of bridge arms. For example, the control module 12 may control the main switches in the bridge arm 11B and the bridge arm 11C, or control the main switch in the bridge arm 11B, or control the main switch in the bridge arm 11C.

It can be learned that the control module 12 may control a main switch in one or more, other than a bridge arm (that is, the first bridge arm) coupled to the first electrode of the power supply 21 at a bridge arm midpoint, of the plurality of bridge arms, so that the winding in the motor and the bridge arm form a boost circuit. The formed boost circuit may boost the voltage provided by the power supply 21, and transmit boosted electric energy to the power battery 11, to charge the power battery 11.

The control module 12 controls each switch in each bridge arm, and may generate a drive signal through pulse width modulation (PWM) to drive each switch. For any switch, a drive signal of a first level may be used to drive the switch to be in the turn-on state, and a drive signal of a second level may be used to drive the switch to be in a turn-off state. Optionally, the first level may be a high level, and the second level may be a low level.

Figure 15:
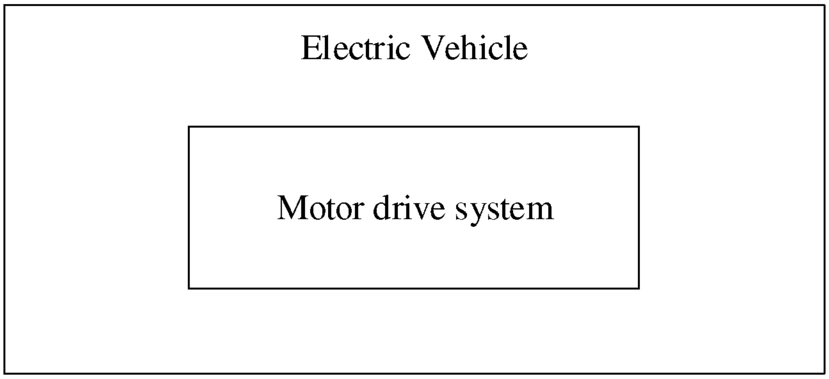
FIG. 15 is a schematic diagram of an electric vehicle including a motor drive system, according to embodiments of the application.

The control module 12 may obtain 31 a rotor position angle of the motor. When the motor drive system is used for the electric vehicle, as shown in FIG. 15, the control module 12 may obtain the rotor position angle of the motor after the electric vehicle is parked.

Generally, when the vehicle is in a stop state or a parking state, a vehicle control unit (VCU) of the vehicle may deliver a torque stop instruction or a zero torque instruction. The control module 12 may determine, according to a stop instruction delivered by the VCU, that the vehicle is in the stop state. When the vehicle is in the stop state, the VCU may further deliver a parking instruction, for example, a P-gear lock instruction or an electrical park brake (EPB) lock instruction. When the vehicle is in a running state, the VCU generally sends a torque instruction to the control module 12, so that the control module 12 controls the motor.

The control module 12 may obtain 31 the rotor position angle of the motor, and control a main switch in the bridge arm other than the first bridge arm in the motor in a control manner corresponding to the position angle, to enable the power supply 21 to charge the power battery 11.

In some cases, after determining that the vehicle is parked, the control module 12 may obtain 31 the rotor position angle of the motor, and control the motor in the control manner corresponding to the rotor position angle of the motor. Alternatively, the control module 12 may obtain rotor position angles of the motor for a plurality of times in a process in which the power supply 21 charges the power battery 11, and control the motor in control manners corresponding to the obtained rotor position angles of the motor, to perform switching between the control manners.

The control manner corresponding to the rotor position angle may be determined based on a preset relationship between a position angle set and a control manner. For example, the control module 12 may pre-obtain or store the relationship between a position angle set and a control manner. The control module 12 may determine, based on the relationship between a position angle set and a control manner, a control manner corresponding to a position angle set to which the obtained rotor position angle belongs as the control manner corresponding to the obtained rotor position angle. Generally, each position angle set includes one or more position angles.

The following first describes a control manner that may be used by the control module 12. For ease of understanding of a control process in embodiments of this application, the following uses an example in which the second electrode of the power supply 21 may be coupled to the first electrode of the power battery 11 (for example, the anode (positive (+) terminal) of the power battery 11), that is, the main switch in each bridge arm is the first switch, to describe a process in which the control module 12 controls the main switch in each bridge arm.

The control module 12 may control main switches in a plurality of bridge arms except the first bridge arm in a plurality of control manners. For example, the control module 12 may control the main switches in the plurality of bridge arms except the first bridge arm in a parallel in-phase control manner, a parallel interleaved control manner, or a series control manner.

In an example, the control module 12 may control main switches in any two bridge arms other than the first bridge arm in the plurality of bridge arms in the parallel in-phase control manner. For example, the control module 12 may control the switch T1 in the bridge arm 11A and the switch T5 in the bridge arm 11C.

Figure 3:
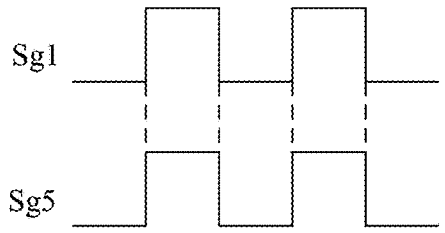
FIG. 3 is a schematic diagram of drive signals of main switches in two bridge arms in a parallel in-phase control manner.

The control module 12 may control the switch T1 and the switch T5 to be periodically in the turn-on state in the parallel in-phase control manner. In addition, the control module 12 may control the switch T1 and the switch T5 to be in the turn-on state at a same start moment, and the switch T1 and the switch T5 to be in the turn-on state at a same end moment. As shown in FIG. 3, the control module 12 may separately generate a drive signal Sg1 of the switch T1 and a drive signal Sg5 of the switch T5. A start moment of a high level of the drive signal Sg1 is the same as a start moment of a high level of the drive signal Sg5. An end moment of the high level of the drive signal Sg1 is the same as an end moment of the high level of the drive signal Sg5. The control module 12 may control the switch T2 and the switch T6 to be in the turn-off state, for example, not generate drive signals of the switch T2 and the switch T6, or generate drive signals of low levels of the switch T2 and the switch T5.

Figure 4:
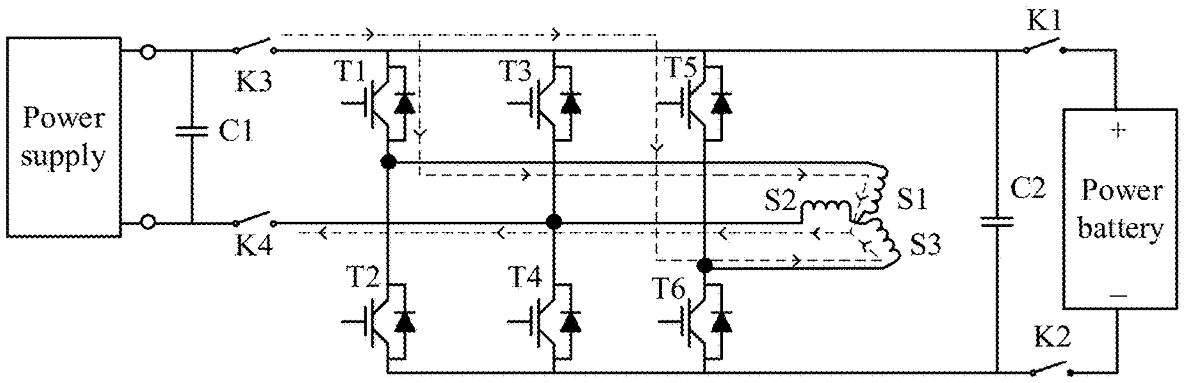
FIG. 4 is a schematic diagram of a charging loop in a charging process.

Refer to FIG. 4. When the switch T1 and the switch T5 are in the turn-on state, a direction of a current in a loop in which the power supply provides electric energy is shown by a dashed line in FIG. 4. Both the first winding S1 corresponding to the bridge arm 11A and the third winding S3 corresponding to the bridge arm 11C are in an energy storage state. A current between the power supply and the bridge arm 11B is Iw=Iu+Iv. Iw is a current in the W-phase winding (that is, the winding S3), Iu is a current in the U-phase winding (that is, the winding S1), and Iv is a current in the V-phase winding (that is, the winding S2). The switch T1 and the switch T5 have same turn-on duration, that is, a duty cycle of the drive signal Sg1 of the switch T1 is the same as a duty cycle of the drive signal Sg5 of the switch T5. Therefore, a ratio of Iu to Iv is 1:1, that is, Iu is equal to Iv.

Figure 5:
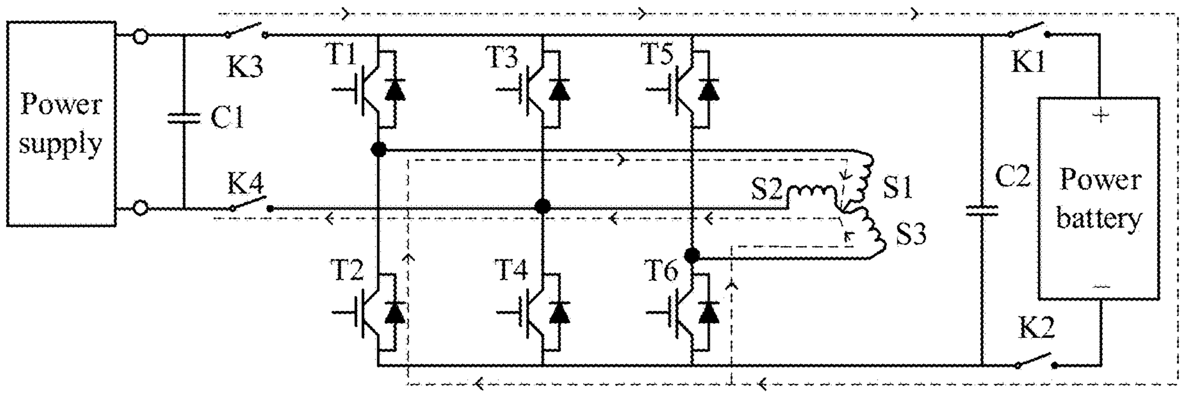
FIG. 5 is a schematic diagram of another charging loop in a charging process.

Refer to FIG. 5. When the switch T1 and the switch T5 are in the turn-off state, a direction of a current in a charging loop of the power battery is shown by a dashed line in FIG. 5. The first winding S1, the second winding S2, and the power supply charge the power battery together. Electric energy stored in the first winding S1 may be released by using a diode of the switch T2 in the bridge arm 11A. Electric energy stored in the third winding S3 may be released by using a diode of the switch T6 in the bridge arm 11C. Alternatively, the control module 12 may control the switch T2 and the switch T6 to be in the turn-on state, so that electric energy stored in the first winding S1 is released by using the switch T2, and electric energy stored in the third winding S3 is released by using the switch T6. FIG. 3 shows a drive signal Sg2 of the switch T2 and a drive signal Sg6 of the switch T6. The switch T2 and the switch T6 are in the turn-on state at a same start moment and a same end moment. In each bridge arm, there may be a complementary relationship between a drive signal of the first switch and a drive signal of the second switch.

In another example, the control module 12 may control main switches in any two of the plurality of bridge arms in the parallel interleaved control manner. For example, the control module 12 may control the switch T1 in the bridge arm 11A and the switch T5 in the bridge arm 11C.

The control module 12 may control the switch T1 and the switch T5 to be periodically in the turn-on state at different turn-on start moments or different turn-on end moments or at different turn-on start moments and different turn-on end moments in the parallel interleaved control manner.

Figure 6:
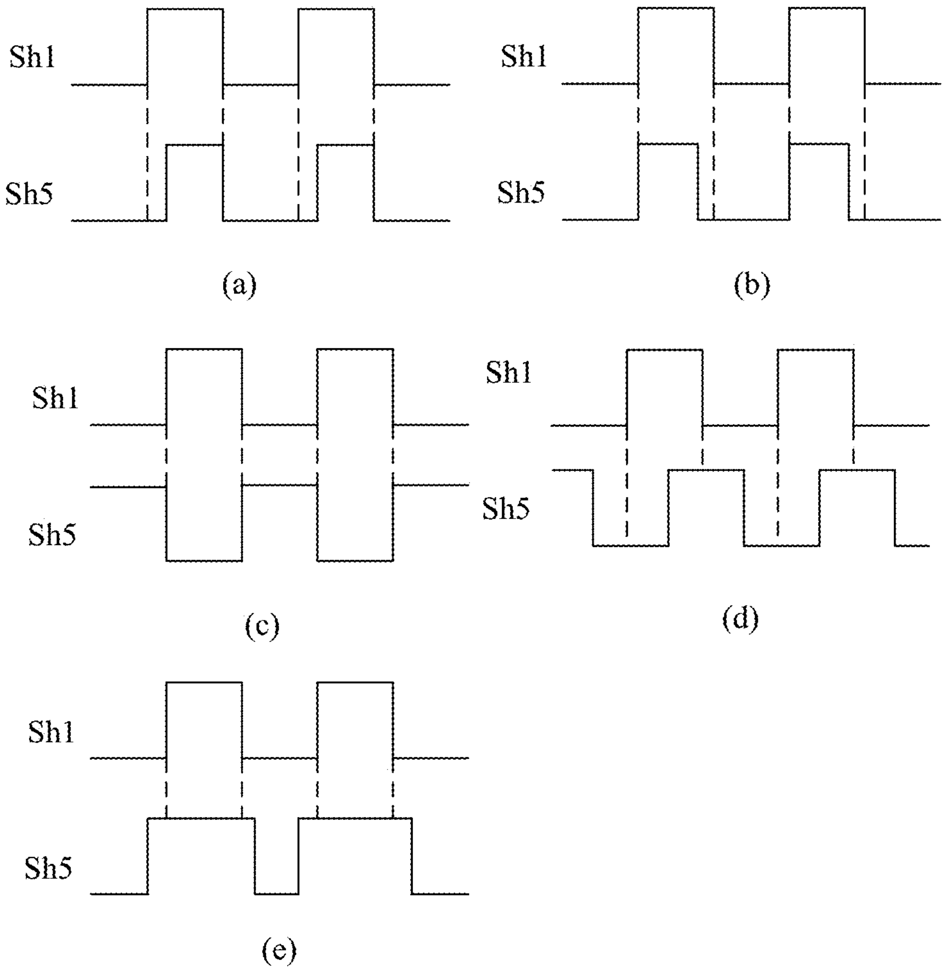
FIG. 6 is a schematic diagram of drive signals of main switches in two bridge arms in a parallel interleaved control manner.

As shown in FIG. 6, the control module 12 may separately generate a drive signal Sh1 of the switch T1 and a drive signal Sh5 of the switch T5. As shown in (a) in FIG. 6, a start moment of a high level of the drive signal Sh1 is different from a start moment of a high level of the drive signal Sh5, and an end moment of the high level of the drive signal Sh1 may be the same as an end moment of the high level of the drive signal Sh5.

Alternatively, as shown in (b) in FIG. 6, a start moment of a high level of the drive signal Sh1 may be the same as a start moment of a high level of the drive signal Sh5, and an end moment of the high level of the drive signal Sh1 is different from an end moment of the high level of the drive signal Sh5.

Alternatively, as shown in (c) in FIG. 6, a start moment of a high level of the drive signal Sh1 is different from a start moment of a high level of the drive signal Sh5, and an end moment of the high level of the drive signal Sh1 is also different from an end moment of the high level of the drive signal Sh5. A time period corresponding to the high level of the drive signal Sh1 does not overlap a time period corresponding to the high level of the drive signal Sh5.

Alternatively, as shown in (d) in FIG. 6, a start moment of a high level of the drive signal Sh1 is different from a start moment of a high level of the drive signal Sh5, and an end moment of the high level of the drive signal Sh1 is also different from an end moment of the high level of the drive signal Sh5. A time period corresponding to the high level of the drive signal Sh1 partially overlaps a time period corresponding to the high level of the drive signal Sh5.

Alternatively, as shown in (e) in FIG. 6, a start moment of a high level of the drive signal Sh1 is different from a start moment of a high level of the drive signal Sh5, and an end moment of the high level of the drive signal Sh1 is also different from an end moment of the high level of the drive signal Sh5. In the switch T1 and the switch T5, a time period corresponding to a high level of a drive signal of one switch may fall within a time period corresponding to a high level of a drive signal of the other switch. For example, a time period corresponding to the high level of the drive signal Sh1 falls within a time period corresponding to the high level of the drive signal Sh5. To be specific, when the switch T1 is in the turn-on state, the switch T5 is also in the turn-on state, but in a time period after the switch T1 changes from the turn-on state to the turn-off state, the switch T5 is still in the turn-on state.

The control module 12 may adjust the start moment and the end moment of the high level of the drive signal Sh1 of the switch T1 and the start moment and the end moment of the high level of the drive signal Sh5 of the switch T5 by adjusting a phase difference (a difference) between and duty cycles of the drive signal Sh1 of the switch T1 and the drive signal Sh5 of the switch T5.

When the control module 12 uses the parallel interleaved control manner, and both the switch T1 and the switch T5 are in the turn-on state, a direction of a current in a loop in which the power supply provides electric energy is shown by a dashed line in FIG. 4. Both the first winding S1 corresponding to the bridge arm 11A and the third winding S3 corresponding to the bridge arm 11C are in an energy storage state. A current between the power supply and the bridge arm 11B is Iw=Iu+Iv. A ratio of Iu to Iv is a ratio of a duty cycle of the drive signal Sh1 of the switch T1 to a duty cycle of the drive signal Sh5 of the switch T5.

The ratio of the duty cycle of the drive signal Sh1 of the switch T1 to the duty cycle of the drive signal Sh5 of the switch T5 is equal to a ratio of turn-on duration of the switch T1 to turn-on duration of the switch T5. If the duty cycle of the drive signal Sh1 of the switch T1 is the same as the duty cycle of the drive signal Sh5 of the switch T5, the turn-on duration of the switch T1 is the same as the turn-on duration of the switch T5.

Figure 7:
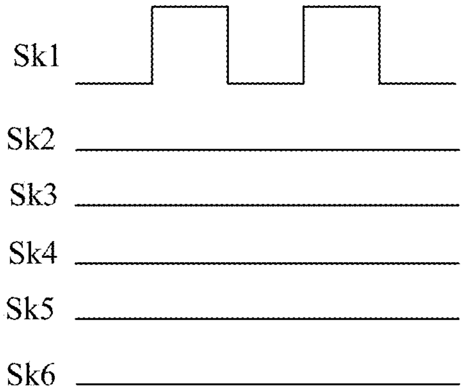
FIG. 7 is a schematic diagram of drive signals of main switches in two bridge arms in a series control manner.

In still another example, the control module 12 may control a main switch in any one of the plurality of bridge arms in the series control manner. For example, the control module 12 may control the switch T1 in the bridge arm 11A. The control module 12 may control the switch T1 to be periodically in the turn-on state in the series control manner. Alternatively, the control module 12 controls the switch T1 and the switch T2 to be alternately turned on. As shown in FIG. 7, the control module 12 may generate a drive signal Sk1 of the switch T1 based on a preset duty cycle. Other switches are all in the turn-off state. For example, a drive signal Sk2 of the switch T2, a drive signal Sk3 of the switch T3, a drive signal Sk4 of the switch T4, a drive signal Sk5 of the switch T5, and a drive signal Sk6 of the switch T6 are all have low levels. For another example, no drive signal is sent to the switches T2 to T6.

Figure 8:
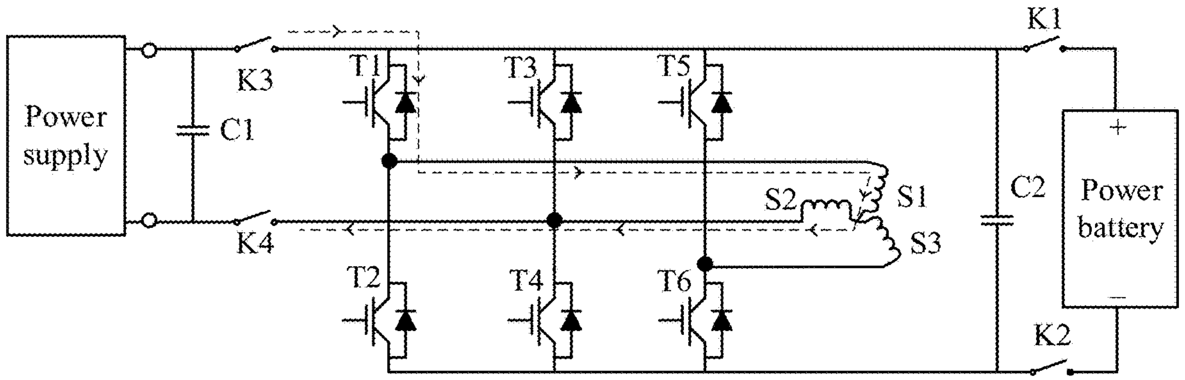
FIG. 8 is a schematic diagram of a charging loop in a charging process.
Figure 9:
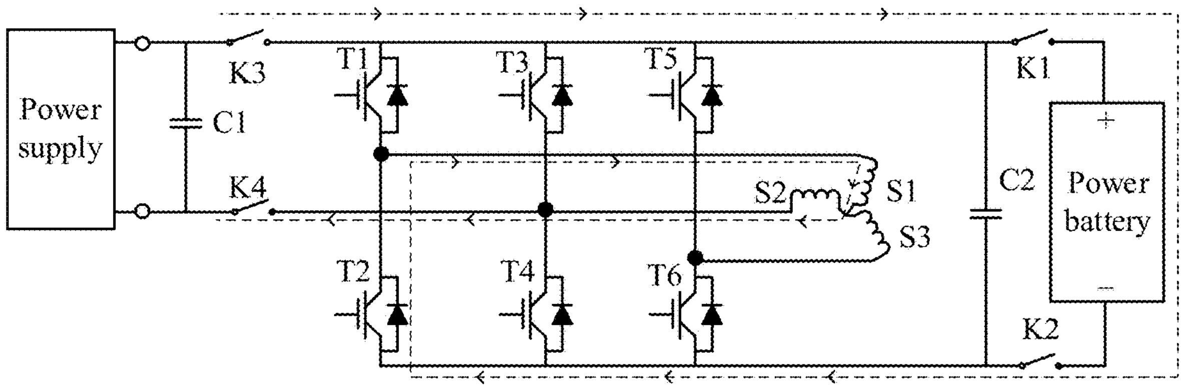
FIG. 9 is a schematic diagram of a charging loop in a charging process.

As shown in FIG. 8, when the switch T1 is in the turn-on state, a direction of a current in a loop in which the power supply provides electric energy is shown by a dashed line in FIG. 7. In this case, the first winding S1 is in an energy storage state, and a current between the power supply and the bridge arm 11B is Iw=Iu. As shown in FIG. 9, when the switch T1 is in the turned-off open state, a current in a charging loop of the power battery is shown by a dashed line in FIG. 10. The first winding S1 and the power supply charge the power battery together.

It can be learned from the foregoing descriptions that the control module 12 may use the plurality of control manners to perform boost processing, by reusing the winding in the motor, on the voltage provided by the power supply, and provide boosted electric energy to the power battery, to charge the power battery.

Generally, after the vehicle is parked, in different rotor position angles of the motor, the control module 12 may control the bridge arm in different control manners, so that different motor performance improvement effects are achieved.

The following first describes the foregoing relationship between a position angle set and a control manner. The control module 12 may pre-obtain the relationship between a position angle set and a control manner. Alternatively, the control module 12 may store the relationship between a position angle set and a control manner. The relationship between a position angle set and a control manner may include a correspondence between different position angle sets and different control manners, for example, a correspondence between a plurality of position angle sets and the foregoing at least two control manners, or include a correspondence between a plurality of position angle sets and the foregoing three control manners. Each position angle set may include one or more position angles.

It should be understood that, in descriptions of this application, terms such as "first" and "second" are merely used for a purpose of distinguishing for description, and should not be construed as indicating or implying relative importance, nor as indicating or implying a sequence. In some examples, the plurality of position angle sets may include at least a first position angle set and a second position angle set. A control manner corresponding to the first position angle set is a first control manner. A control manner corresponding to the second position angle set may be a second control manner. The first control manner may be the parallel in-phase control manner, the parallel interleaved control manner, or the series control manner. The second control manner may be the parallel in-phase control manner, the parallel interleaved control manner, or the series control manner. The first control manner and the second control manner are different control manners. It can be learned that, if rotor position angles obtained by the control module 12 belong to different position angle sets, the rotor position angles may correspond to different control manners, and the control module may control the bridge arm in the different control manners.

In some other examples, the plurality of position angle sets may further include a third position angle set, and a control manner corresponding to the third position angle set is a third control manner. The third control manner may be the parallel in-phase control manner, the parallel interleaved control manner, or the series control manner. If rotor position angles obtained by the control module 12 belong to different position angle sets, the rotor position angles may correspond to different control manners or a same control manner. For example, the first position angle set corresponds to the first control manner, the second position angle set corresponds to the second control manner, and the third position angle set may correspond to the first control manner. If a set to which rotor position angles belong is the first position angle set or the third position angle set, all control manners corresponding to the rotor position angles are the first control manner.

In embodiments of this application, there may be two, three, four, or more position angle sets. A quantity of the plurality of position angle sets may be configured based on an actual application scenario.

In an example, the position angle sets may not overlap. In another example, some elements in the position angle sets may overlap. For example, boundaries of two position angle sets may overlap on a small scale. The control module 12 may determine, in a manner such as hysteresis control, a control manner corresponding to a position angle within an overlapping range of the position angle sets.

For example, the hysteresis control manner that may be used by the control module 12 is as follows: It should be noted that the hysteresis control manner described below is merely used as an example for description, and is not considered as a specific limitation on an action performed by the control module 12. In this application, the control module 12 may alternatively use another hysteresis control manner.

Boundaries of a position angle set A and a position angle set B overlap on a small scale, and an overlapping range is denoted as a set cm. When a rotor position angle of the motor changes from falling within (belonging to) the position angle set A to falling within the position angle set B, the control module 12 may first control the bridge arm in the motor in a control manner corresponding to the position angle set A. If an obtained position angle of the rotor belongs to the set cm, the control module 12 controls the bridge arm in the control manner corresponding to the position angle set A. When a rotor position angle of the motor changes from falling within the position angle set B to falling within the position angle set A, the control module 12 may first control the bridge arm in the motor in a control manner corresponding to the position angle set B. If an obtained position angle of the rotor belongs to the set cm, the control module 12 controls the bridge arm in a control manner corresponding to the position angle set B.

After obtaining a motor position angle of the rotor, the control module 12 may determine a position angle set (denoted as a position angle set m) to which the obtained rotor position angle of the motor belongs. Then, the control module 12 may control the bridge arm other than the first bridge arm in the motor in a control manner corresponding to the position angle set m, so that motor performance can be improved.

In a possible implementation, the relationship between a position angle set and a control manner may be determined based on a relationship between a loss of the motor and a rotor position angle that are obtained when the control module 12 controls the switch in the bridge arm in each control manner. A relationship between a magnetic steel loss of the motor and a rotor position angle may be based on a loss of the motor obtained when the control module 12 controls the bridge arm other than the first bridge arm in the motor in each control manner in any position angle in the position angle set. The loss of the motor may also be referred to as a thermal property of the motor. The following uses the magnetic steel loss of the motor as an example for description.

Figure 10:
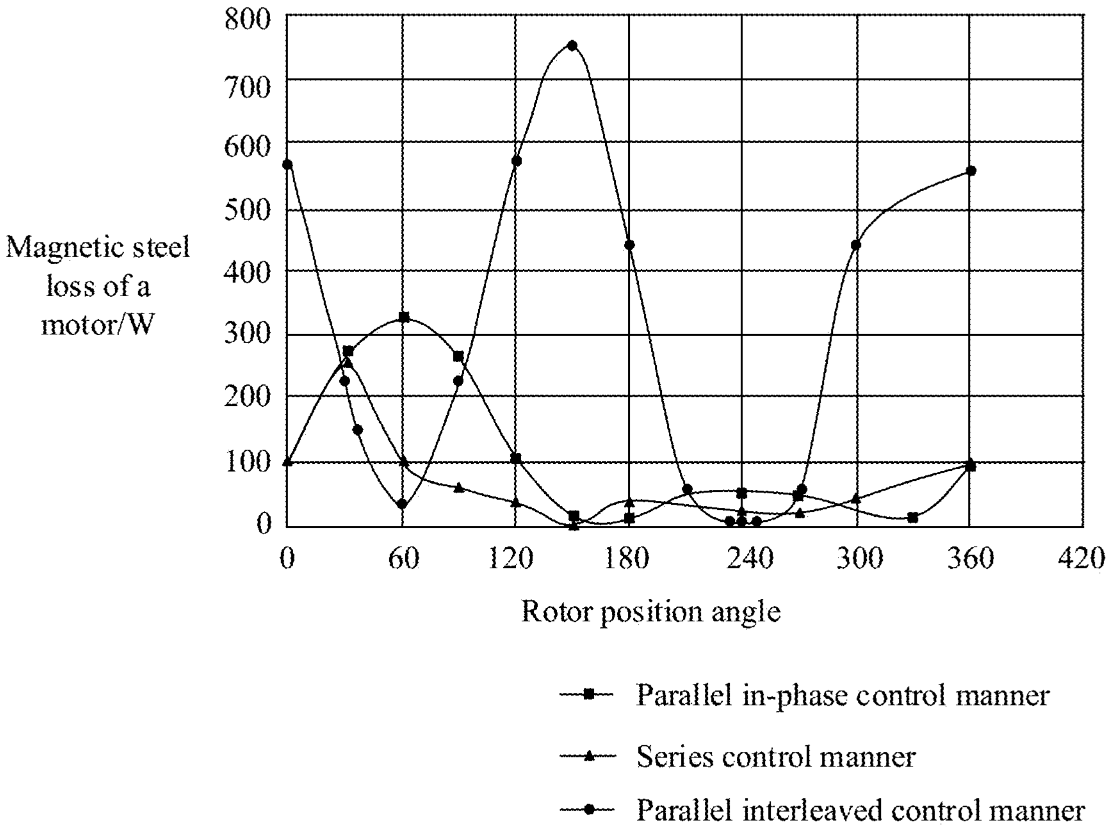
FIG. 10 is a schematic diagram of a relationship between a rotor position angle and a magnetic steel loss of a motor in different control manners.

As shown in FIG. 10, after the vehicle is parked, when the control module 12 separately controls the bridge arm other than the first bridge arm in the motor in the foregoing three different control manners in different rotor position angles of the motor, a thermal property change of the motor (for example, the magnetic steel loss of the motor) varies. When the control module 12 controls the bridge arm in the parallel in-phase control manner, the duty cycle of the drive signal Sh1 of the switch T1 is the same as the duty cycle of the drive signal Sh5 of the switch T5. In this case, a stator vector of the motor is 240 degrees. When the control module 12 controls the bridge arm in the parallel interleaved control manner, the duty cycle of the drive signal Sh1 of the switch T1 is the same as the duty cycle of the drive signal Sh5 of the switch T5. In this case, a stator vector of the motor is 240 degrees. When the control module 12 controls the bridge arm in the series control manner, only the main switch in the bridge arm 11A (a U-phase bridge arm) is controlled. In this case, a stator vector of the motor is 210 degrees. In this specification, the stator vector and the rotor position angle are described based on zero degrees of a U phase, to describe a control method.

It can be learned from FIG. 10 that, if the rotor position angle of the motor falls within a rotor position angle range of 0 degrees to 30 degrees, a magnetic steel loss of the motor obtained when the control module 12 controls the bridge arm in the parallel interleaved control manner is clearly greater than a magnetic steel loss of the motor obtained when the control module 12 controls the bridge arm in the series control manner or the parallel in-phase control manner. If the rotor position angle of the motor falls within a rotor position angle range of 30 degrees to 60 degrees, a magnetic steel loss of the motor obtained when the control module 12 controls the bridge arm in the parallel in-phase control manner is the largest, a magnetic steel loss of the motor obtained when the control module 12 controls the bridge arm in the series control manner is slightly lower, and a magnetic steel loss of the motor obtained when the control module 12 controls the bridge arm in the parallel interleaved control manner is the lowest. If the rotor position angle of the motor falls within a rotor position angle range of 60 degrees to 150 degrees, a magnetic steel loss of the motor obtained when the control module 12 controls the bridge arm in the series control manner is the smallest. If the rotor position angle of the motor falls within a rotor position angle range of 150 degrees to 360 degrees, a magnetic steel loss of the motor obtained when the control module 12 controls the bridge arm in the parallel in-phase control manner is close to a magnetic steel loss of the motor obtained when the control module 12 controls the bridge arm in the series control manner, and a magnetic steel loss of the motor obtained when the control module 12 controls the bridge arm in the parallel interleaved control manner is larger.

It can be learned that, when the control module 12 controls the bridge arm in different control manners, a value of the thermal property (the magnetic steel loss) of the motor varies with a rotor position angle of the motor. In some position angle sets, the control module 12 may control the bridge arm in a control manner corresponding to a position angle set to which a rotor position angle of the motor belongs, so that a magnetic steel loss of the motor can be reduced.

In an example, the plurality of position angle sets may be: a set m1=[0, 30), a set m2=[30, 70), a set m3=[70, 150), a set m4=[150, 210), a set m5=[210, 270), and a set m6=[270, 360].

In the relationship between a position angle set and a control manner, a control manner corresponding to the set m1 may be the series control manner or the parallel control manner. If the rotor position angle of the motor falls within a rotor position angle range of 0 degrees to 30 degrees, a magnetic steel loss of the motor obtained when the control module 12 controls the bridge arm in the series control manner or the parallel in-phase control manner is the smallest. If the control module 12 controls the bridge arm other than the first bridge arm in the motor in the series control manner, high current pressure is caused to a power device such as a switch (a semiconductor device) in the bridge arm. If thermal stress of the power device is high, the set m1 may uniquely correspond to the parallel in-phase control manner. If the rotor position angle of the motor falls within the rotor position angle range of 0 degrees to 30 degrees, the control module 12 may control the bridge arm in the parallel in-phase control manner, so that not only the magnetic steel loss of the motor can be reduced, but also the power device in the bridge arm can be protected.

In the relationship between a position angle set and a control manner, a control manner corresponding to the set m2 may be the parallel interleaved control manner. If the rotor position angle of the motor falls within a rotor position angle range of 30 degrees to 70 degrees, a magnetic steel loss of the motor obtained when the control module 12 controls the bridge arm in the parallel interleaved control manner is the smallest. A control manner corresponding to the set m3 may be the series control manner. If the rotor position angle of the motor falls within a rotor position angle range of 70 degrees to 150 degrees, a magnetic steel loss of the motor obtained when the control module 12 controls the bridge arm in the series control manner is the smallest. A control manner corresponding to the set m4 may be the parallel in-phase control manner. If the rotor position angle of the motor falls within a rotor position angle range of 150 degrees to 210 degrees, a magnetic steel loss of the motor obtained when the control module controls the bridge arm in the parallel in-phase control manner is the smallest.

In the relationship between a position angle set and a control manner, a control manner corresponding to the set m5 may be the series control manner. If the rotor position angle of the motor falls within a rotor position angle range of 210 degrees to 270 degrees, a magnetic steel loss of the motor obtained when the control module 12 controls the bridge arm in the series control manner is the smallest. A control manner corresponding to the set m6 may be the parallel in-phase control manner. If the rotor position angle of the motor falls within a rotor position angle range of 270 degrees to 360 degrees, a magnetic steel loss of the motor obtained when the control module 12 controls the bridge arm in the parallel in-phase control manner is the smallest.

In another example, in consideration of heat dissipation performance when the motor is a water-cooled motor or an oil-cooled motor, the foregoing relationship between a position angle set and a control manner includes a plurality of position angle sets and two control manners. In such a design, a processing procedure of the control module 12 can be simplified, and the motor drive system provided in embodiments of this application can be more widely applied.

Figure 11:
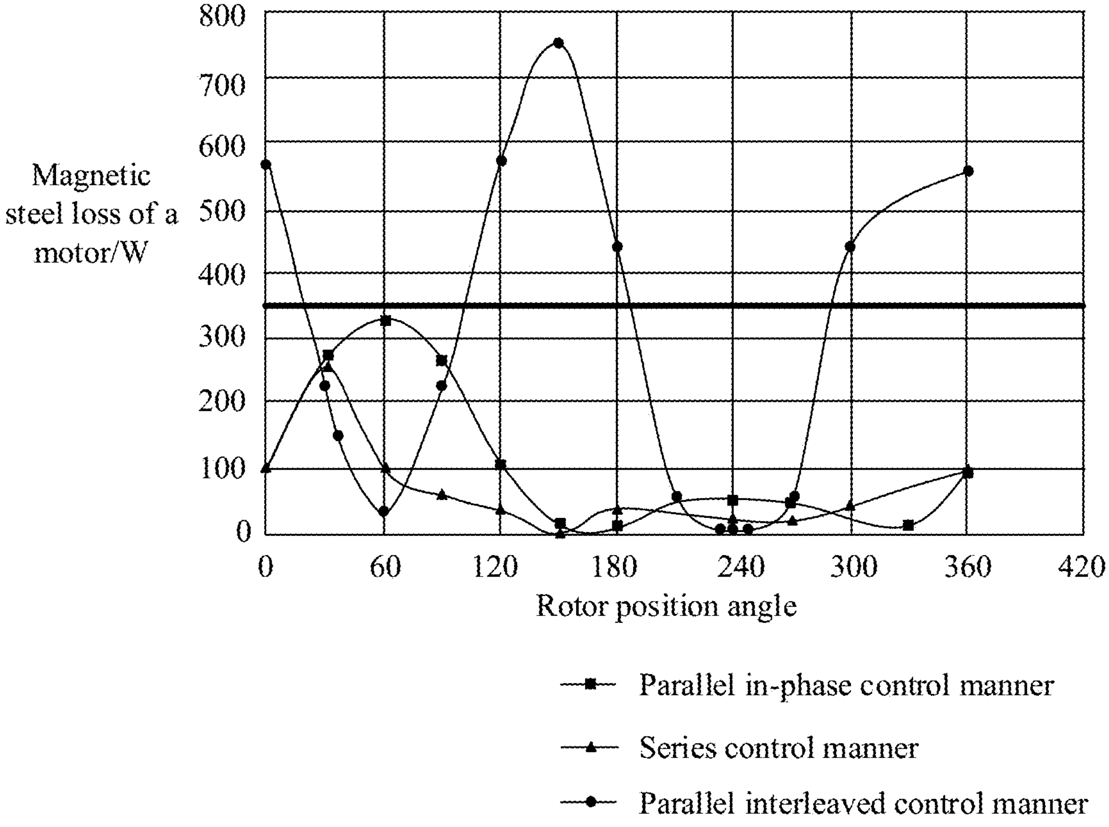
FIG. 11 is a schematic diagram of a relationship between a rotor position angle and a magnetic steel loss of a motor and a magnetic steel loss threshold in different control manners.

Optionally, the relationship between a position angle set and a control manner may be further determined based on a magnetic steel loss threshold of the motor and a relationship between a rotor position angle of the motor and a magnetic steel loss of the motor that are obtained in each control manner. A thick line output in FIG. 11 may represent the magnetic steel loss threshold.

In a control manner corresponding to each position angle set, a magnetic steel loss of the motor is less than the magnetic steel loss threshold. For example, the plurality of position angle sets may be a set m7=[0, 120) and a set m8=[120, 360]. The magnetic steel loss threshold may be 350 W. A control manner corresponding to the set m7 is the series control manner. A control manner corresponding to the set m8 is the series control manner or the parallel in-phase control manner. If the rotor position angle of the motor falls within a rotor position angle range of 120 degrees to 360 degrees, a magnetic steel loss of the motor obtained when the control module 12 controls the bridge arm in the series control manner is close to a magnetic steel loss of the motor obtained when the control module 12 controls the bridge arm in the parallel in-phase control manner.

If the control module 12 controls one bridge arm in the series control manner, high current pressure is caused to a power device such as a switch (a semiconductor device) in the bridge arm. If thermal stress of the power device is high, the set m8 may uniquely correspond to the parallel in-phase control manner. If the rotor position angle of the motor falls within a rotor position angle range of 120 degrees to 360 degrees, the control module 12 may control the bridge arm in the parallel in-phase control manner, so that not only the magnetic steel loss of the motor can be reduced, but also the power device in the bridge arm can be protected.

In some scenarios, if a rotor position angle set to which the position angle rotor of the motor belongs corresponds to the series control manner or the parallel in-phase control manner, a magnetic steel loss of the motor obtained when the control module 12 controls the bridge arm in the series control manner is close to a motor magnetic steel loss obtained when the control module 12 controls the bridge arm in the parallel in-phase control manner. If thermal stress of the power device in the bridge arm is high, the control module 12 may preferably control the bridge arm in the parallel in-phase control manner. If the motor drive system requires a smaller output ripple current, the control module 12 may preferably control the bridge arm in the series control manner.

The plurality of position angle sets may include at least a first position angle set and a second position angle set. A control manner corresponding to the first position angle set is the parallel in-phase control manner. A control manner corresponding to the second position angle set may be the parallel interleaved control manner. Optionally, the plurality of position angle sets may further include a third position angle set, and a control manner corresponding to the third position angle set is the series control manner.

In a possible case, when the control module 12 controls the bridge arm in the parallel interleaved control manner, the duty cycle of the drive signal Sh1 of the switch T1 may be the same as the duty cycle of the drive signal Sh5 of the switch T5. In this case, Iv is equal to Iu, Iv is equal to 0.5Iw, Iu is equal to 0.5Iw, and the stator vector of the motor is 240 degrees. When the control module 12 controls the bridge arm in the parallel interleaved control manner, the duty cycle of the drive signal Sh1 of the switch T1 may be adjusted, and/or the duty cycle of the drive signal Sh5 of the switch T5 may be adjusted, so that a ratio of Iv to Iw and a ratio of Iu to Iw may be changed. In this case, the stator vector of the motor changes, and an adjustable range of the stator vector based on 240 degrees is ±30 degrees, or the stator vector may be a value within a range of 210 degrees to 270 degrees. In the parallel interleaved control manner, Iu falls within a range of 0 to 100% Iw, and Iv falls within a range of 100% Iw to 100% Iw−Iu. It can be learned that, in the parallel interleaved control manner, a ratio of a U-phase current to a W-phase current is different from a ratio of a V-phase current to a W-phase current, and the stator vector of the motor varies.

When the control module 12 controls the bridge arm in the parallel interleaved control manner, the ratio of Iv to Iw and the ratio of Iu to Iw are changed, and the stator vector of the motor is changed. The torque of the motor varies with a relative angle between the stator vector of the motor and the rotor position angle of the motor. The control module 12 may re-obtain a rotor position angle of the motor, for example, re-determine the rotor position angle of the motor. Then, the bridge arm other than the first bridge arm in the motor is controlled in a control manner corresponding to a position angle set to which an updated rotor position angle of the motor belongs. For example, if the position angle set to which the updated rotor position angle of the motor belongs is the third position angle set, the control module 12 may control the bridge arm in a control manner, for example, the series control manner, corresponding to the third position angle set. Optionally, if the control manner corresponding to the position angle set to which the updated rotor position angle of the motor belongs is the same as a control manner corresponding to a position angle set to which a rotor position angle of the motor that is last obtained by the control module 12 belongs, the control module 12 may not change a current control manner, or maintain a current control manner.

In another example, the plurality of position angle sets may be a set m9=[0, 60), a set m10={60}, and a set m11=(60, 360]. In the relationship between a position angle set and a control manner, a control manner corresponding to the set m9 is the parallel in-phase control manner. A control manner corresponding to the set m10 is the parallel interleaved control manner. A control manner corresponding to the set m11 is the parallel in-phase control manner. Optionally, when the control module 12 controls the bridge arm in the parallel interleaved control manner, the duty cycle of the drive signal Sh1 of the switch T1 may be adjusted, and/or the duty cycle of the drive signal Sh5 of the switch T5 may be adjusted, so that a ratio of Iv to Iw and a ratio of Iu to Iw are changed. For example, Iv is 0.8Iw, and Iu is 0.2Iw. Alternatively, Iu is 0.8Iw, and Iv is 0.2Iw. In such a design, an angle between a stator and a rotor may be adjusted to change the magnetic steel loss, so that the magnetic steel loss is reduced.

It can be learned that, in the foregoing example, the relationship between a position angle set and a control manner is determined based on the magnetic steel loss of the motor obtained when the control module controls the bridge arm other than the first bridge arm in the plurality of bridge arms in each of the different control manners in any position angle in the position angle set. In such a design, when the control module 12 controls the bridge arm in the control manner corresponding to the obtained rotor position angle of the motor, the magnetic steel loss of the motor can be minimized (or reduced), thereby improving the motor performance in a process of charging the power battery by reusing the motor.

In another possible implementation, the relationship between a position angle set and a control manner may be a torque of the motor when the control module 12 controls the bridge arm other than the first bridge arm in the plurality of bridge arms in each of the different control manners in any position angle in each position angle set. In other words, the relationship is determined based on a relationship between a torque of the motor and a rotor position angle that are obtained when the control module 12 controls the switch in the bridge arm in each control manner.

Figure 12:
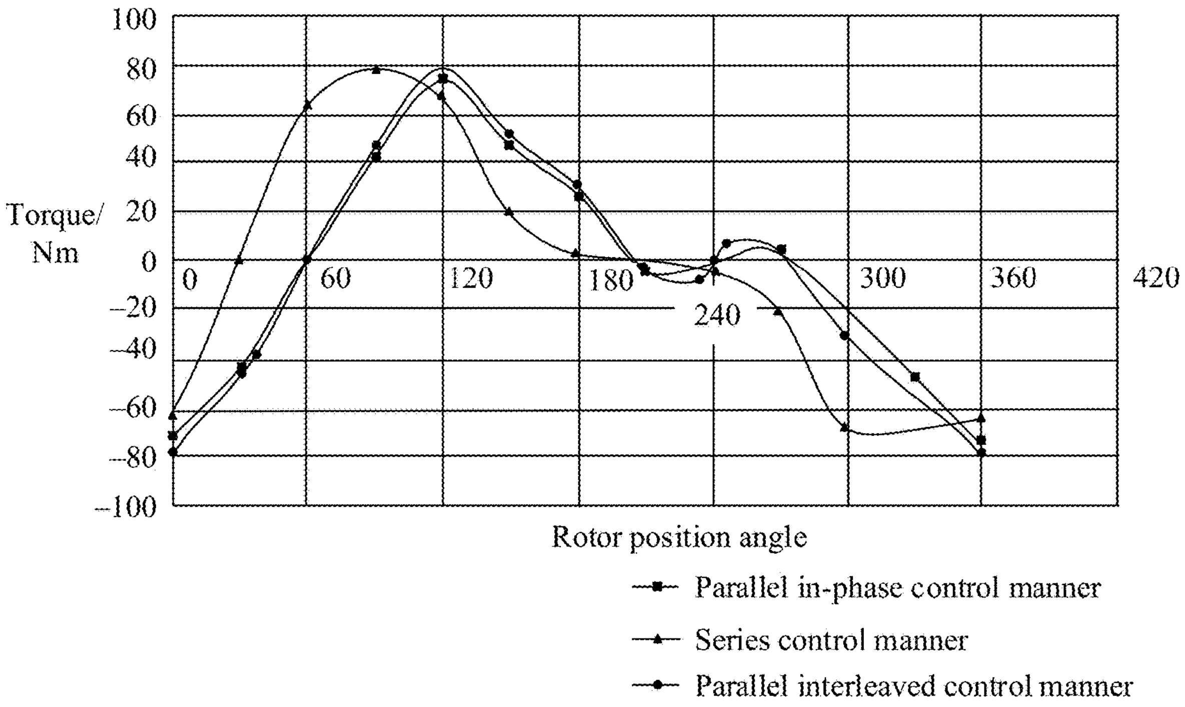
FIG. 12 is a schematic diagram of a relationship between a rotor position angle and a torque of a motor in different control manners.

FIG. 12 is a curve of a relationship between a rotor position angle of the motor and a torque of the motor that are obtained when the control module 12 separately controls the bridge arm in the foregoing three different control manners. When the control module 12 controls the bridge arm in the parallel in-phase control manner, the duty cycle of the drive signal Sg1 of the switch T1 is the same as the duty cycle of the drive signal Sg5 of the switch T5. In this case, the stator vector of the motor is 240 degrees. When the control module 12 controls the bridge arm in the parallel interleaved control manner, the duty cycle of the drive signal Sh1 of the switch T1 is the same as the duty cycle of the drive signal Sh5 of the switch T5. In this case, the stator vector of the motor is 240 degrees. When the control module 12 controls the bridge arm in the series control manner, only the main switch in the bridge arm 11A (the U-phase bridge arm) is controlled. In this case, the stator vector of the motor is 210 degrees.

It can be learned from FIG. 12 that, if the rotor position angle of the motor falls within the rotor position angle range of 0 degrees to 30 degrees, a torque of the motor obtained when the control module 12 controls the bridge arm in the series control manner or the parallel in-phase control manner is small. If the rotor position angle of the motor falls within a rotor position angle range of 30 degrees to 110 degrees, a torque of the motor obtained when the control module 12 controls the bridge arm in the parallel in-phase control manner or controls the bridge arm in the parallel interleaved control manner is small. If the rotor position angle of the motor falls within a rotor position angle range of 110 degrees to 210 degrees, a torque of the motor obtained when the control module 12 controls the bridge arm in the series control manner is small. If the rotor position angle of the motor falls within a rotor position angle range of 210 degrees to 360 degrees, a torque of the motor obtained when the control module 12 controls the bridge arm in the parallel in-phase control manner or the series control manner is small.

In an example, the plurality of position angle sets may be a set ma=[0, 30), a set mb=[30, 110), a set mc=[110, 210), and a set md=[210, 360].

In the relationship between a position angle set and a control manner, a control manner corresponding to the set ma may be the series control manner. If the rotor position angle of the motor falls within the rotor position angle range of 0 degrees to 30 degrees, a torque of the motor obtained when the control module 12 controls the bridge arm in the series control manner or the parallel in-phase control manner is the smallest.

A control manner corresponding to the set mb may be the parallel interleaved control manner or the parallel in-phase control manner. If the rotor position angle of the motor falls within the rotor position angle range of 30 degrees to 110 degrees, a torque of the motor obtained when the control module 12 controls the bridge arm in the parallel interleaved control manner or the parallel in-phase control manner may be small. Optionally, in this case, the control module 12 may use a control manner that can minimize the magnetic steel loss of the motor. The set mb may uniquely correspond to a control manner, and the control module 12 controls the bridge arm in the control manner, so that the torque of the motor is reduced, and the magnetic steel loss of the motor is reduced.

A control manner corresponding to the set me may be the series control manner. If the rotor position angle of the motor falls within the rotor position angle range of 110 degrees to 210 degrees, a torque of the motor obtained when the control module 12 controls the bridge arm in the series control manner is the smallest.

A control manner corresponding to the set md may be the parallel in-phase control manner or the parallel interleaved control manner. If the rotor position angle of the motor falls within the rotor position angle range of 210 degrees to 360 degrees, a torque of the motor obtained when the control module controls the bridge arm in the parallel in-phase control manner or the parallel interleaved control manner is small. Optionally, in this case, the control module 12 may use a control manner that can minimize the magnetic steel loss of the motor. The set md may uniquely correspond to a control manner, and the control module 12 controls the bridge arm in the control manner, so that the torque of the motor is reduced, and the magnetic steel loss of the motor is reduced.

In another example, the relationship between a position angle set and a control manner may be further determined with reference to a torque threshold. The torque threshold may be determined based on a safety torque required when a control gear of the electric vehicle is a P gear and/or a safety torque that can be supported by EPB. The torque threshold is denoted as limit.

In the curve of the relationship between a rotor position angle of the motor and a torque of the motor in the three control manners, a maximum value of the torque of the motor is denoted as max. If limit is greater than or equal to max, the relationship between a position angle set and a control manner is determined based only on a relationship between a torque of the motor and a rotor position angle of the motor that are obtained when the control module 12 controls the bridge arm in each control manner.

Figure 13:
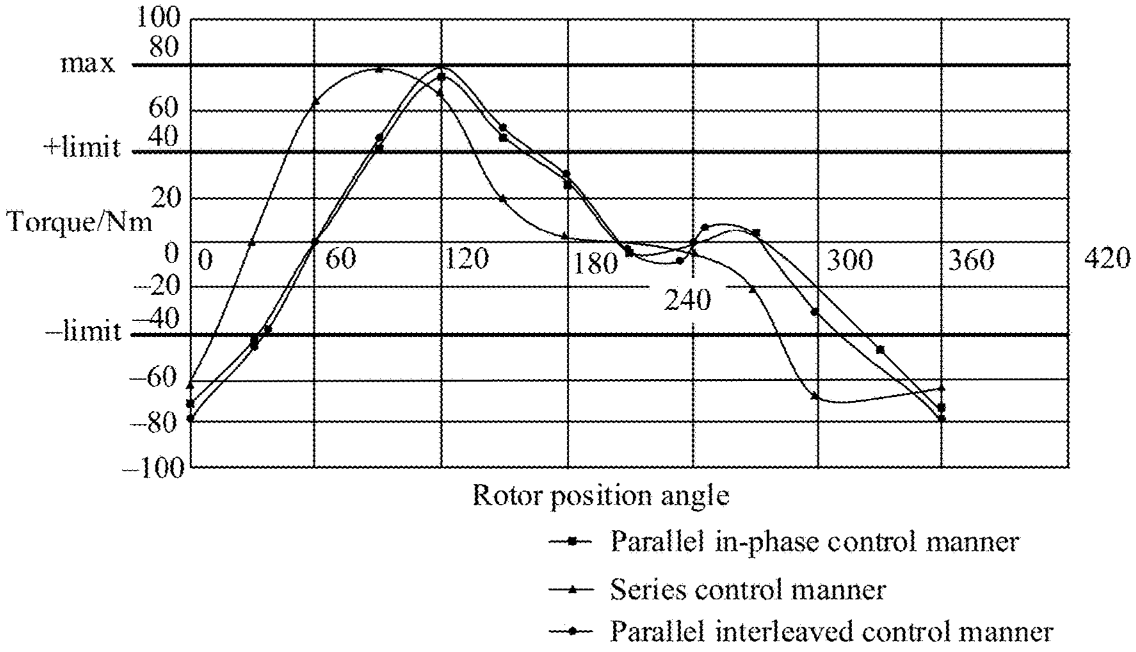
FIG. 13 is a schematic diagram of a relationship between a rotor position angle and a torque of a motor and a torque threshold in different control manners.

In FIG. 13, bold lines represent max, +limit, and −limit. If limit is less than max, it is assumed that limit is 40 and max is 80. It can be learned that, when the rotor position angle falls within a rotor position angle range of 0 degrees to L1 degrees, a rotor position angle range of L2 degrees to L3 degrees, or a rotor position angle range of L4 degrees to 360 degrees, a torque of the motor obtained when the control module 12 controls the bridge arm in each control manner exceeds the torque threshold. In this case, the control module 12 may control the bridge arm in any control manner.

If the rotor position angle falls within a range of L1 degrees to 30 degrees, a torque of the motor obtained when the control module 12 controls the bridge arm in the series control manner or the parallel in-phase control manner is the smallest. If the rotor position angle of the motor falls within a rotor position angle range of 30 degrees to L2 degrees, a torque of the motor obtained when the control module 12 controls the bridge arm in the parallel interleaved control manner or the parallel in-phase control manner may be small. If the rotor position angle falls within a range of L3 degrees to 210 degrees, a torque of the motor obtained when the control module 12 controls the bridge arm in the series control manner is the smallest. If the rotor position angle of the motor falls within a rotor position angle range of 210 degrees to L4 degrees, a torque of the motor obtained when the control module controls the bridge arm in the parallel in-phase control manner or the parallel interleaved control manner is small.

It can be learned that, in the foregoing example, the relationship between a position angle set and a control manner is determined based on the torque of the motor obtained when the control module controls the bridge arm other than the first bridge arm in the plurality of bridge arms in each of the different control manners in any position angle in the position angle set. In such a design, when the control module 12 controls the bridge arm in the control manner corresponding to the obtained rotor position angle of the motor, the torque of the motor can be minimized (or reduced), thereby improving the motor performance in a process of charging the power battery by reusing the motor.

In still another possible implementation, the relationship between a position angle set and a control manner may be determined based on a relationship between a magnetic steel loss of the motor and a rotor position angle and a relationship between a torque of the motor and a rotor position angle. In such a design, when the control module 12 controls the bridge arm in the control manner corresponding to the obtained rotor position angle of the motor, the torque of the motor can be minimized (or reduced), and/or the magnetic steel loss of the motor can be minimized (or reduced), thereby improve the motor performance.

Based on the foregoing descriptions of the motor drive system, this application further provides a vehicle. The vehicle may include any one of the motor drive systems provided in the foregoing embodiments.

In addition, this application further provides a charging method. The method may be applied to any one of the motor drive systems provided in the foregoing embodiments. For example, the motor drive system includes a plurality of bridge arms and a motor. Each of the plurality of bridge arms includes a first switch and a second switch, a first end of the first switch is coupled to a first electrode of a power battery, a second end of the first switch is coupled to a first end of the second switch, and a second end of the second switch is coupled to a second electrode of the power battery. The motor includes a plurality of windings, the plurality of windings are in one-to-one correspondence with the plurality of bridge arms, a first end of each of the plurality of windings is coupled to a common endpoint, and a second end of the winding is coupled to a second end of a first switch in a corresponding bridge arm. A second end of a first switch in one bridge arm in the plurality of bridge arms is coupled to a first electrode of a power supply, and a second electrode of the power supply is coupled to the power battery.

Figure 14:
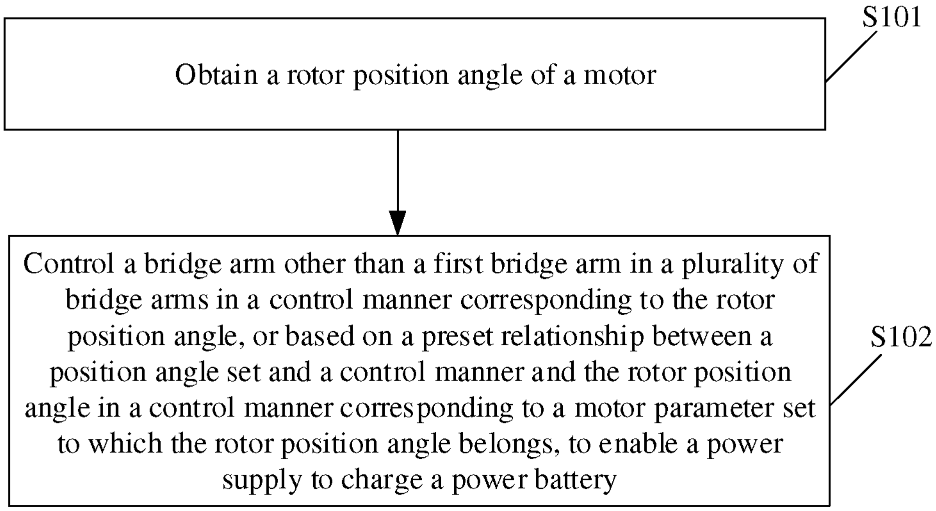
FIG. 14 is a schematic flowchart of a charging method according to this application.

The charging method provided in this application may be performed by the control module 12 in the motor drive system. As shown in FIG. 14, the charging method may include the following steps.

Step S101: Obtain a rotor position angle of the motor.

S102: Control a bridge arm other than a first bridge arm in the plurality of bridge arms in a control manner corresponding to the rotor position angle, to enable the power supply to charge the power battery.

The control manner corresponding to the rotor position angle is determined based on a preset relationship between a position angle set and a control manner, the relationship between a position angle set and a control manner includes a correspondence between different position angle sets and different control manners, and each position angle set includes one or more position angles.

The relationship between a position angle set and a control manner is determined based on at least one of the following:

a torque of the motor obtained when a bridge arm other than the first bridge arm in the plurality of bridge arms is controlled in each of the different control manners in any position angle in the position angle set; or a loss of the motor obtained when a bridge arm other than the first bridge arm in the plurality of bridge arms is controlled in each of the different control manners in any position angle in the position angle set.

In a possible implementation, the control manner includes one of a parallel in-phase control manner, a parallel interleaved control manner, and a series control manner; and the controlling a bridge arm other than the one bridge arm in the plurality of bridge arms includes: controlling main switches in two bridge arms other than the one bridge arm in the plurality of bridge arms to be periodically in a turn-on state at a same turn-on start moment and a same turn-on end moment if the control manner corresponding to the rotor position angle is the parallel in-phase control manner; or controlling main switches in two bridge arms other than the one bridge arm in the plurality of bridge arms to be periodically in a turn-on state at different turn-on start moments and/or different turn-on end moments if the control manner corresponding to the rotor position angle is the parallel interleaved control manner; or controlling a main switch in any bridge arm other than the one bridge arm in the plurality of bridge arms to be periodically in a turn-on state if the control manner corresponding to the rotor position angle is the series control manner, where if the second electrode of the power supply is coupled to the first electrode of the power battery, the main switch is the first switch; or if the second electrode of the power supply is coupled to the second electrode of the power battery, the main switch is the second switch.

In this embodiment of this application, the control module 12 controls the bridge arm in the corresponding control manner based on the obtained rotor position angle of the motor, so that motor performance is improved. For example, a magnetic steel loss is reduced, or a torque of the motor is reduced.

In a possible implementation, the controlling main switches in two bridge arms other than the first bridge arm in the plurality of bridge arms to be periodically in a turn-on state at different turn-on start moments and/or different turn-on end moments if the control manner corresponding to the rotor position angle of the motor is the parallel interleaved control manner further includes: adjusting turn-on duration of a main switch in at least one of the two bridge arms, to change a current proportion in windings that are separately coupled to the two bridge arms.

In this embodiment of this application, the control module 12 adjusts turn-on duration of each main switch in the two controlled bridge arms, to change the current proportion in the windings corresponding to the two bridge arms, so that a position of a stator magnetic field may be changed, that is, a stator vector may be changed. A range of a stator vector change is ±30 degrees. That is, a range of the stator vector may be 240±30 degrees.

In a process in which the control module 12 controls the motor to charge the power battery, the rotor position angle may be changed. The control module 12 may repeat the operations in step S101 and step S102 for a plurality of times.

In a possible implementation, before performing step S101, the control module 12 may further determine that a vehicle to which the motor drive system belongs is in a stop state or a parking state.

This application further provides a control apparatus. The control apparatus may include a memory and a processor. The memory may store computer instructions. The processor may read the computer instructions in the memory, to perform the operation of the control module 12 in the foregoing embodiments, or perform the charging method provided in the foregoing embodiments.

All or some of the foregoing embodiments may be implemented by software, hardware, firmware, or any combination thereof. When software is used to implement the embodiments, all or some of the embodiments may be implemented in a form of a computer program product (for example, a computer readable storage product). The computer readable storage product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, such as a coaxial cable, an optical fiber, or a digital subscriber line (DSL)) or wireless (for example, infrared, radio, and or microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid state disk (SSD)), or the like.

An embodiment of this application further provides a readable storage medium, configured to store the method or the algorithm provided in the foregoing embodiments. For example, the memory is a random access memory (RAM), a flash memory, a read-only memory (ROM), an EPROM memory, a non-volatile read-only memory (Electronic Programmable ROM, EPROM), a register, a hard disk, a removable disk, or a storage medium in any other form in the art.

Steps of the methods or algorithms described in embodiments of this application may be directly embedded into the foregoing control apparatus or control module 12. The control apparatus or the control module 12 may include a RAM memory, a flash memory, a ROM memory, an EPROM memory, a register, a hard disk, a removable disk, or a storage medium in any other form in the art, and is configured to store steps of the method or the algorithm provided in embodiments of this application. For example, the storage medium may be connected to the control apparatus or the control module 12, so that the control apparatus or the control module 12 may read information from the storage medium and write information into the storage medium. Optionally, the storage medium may further be integrated into a control module and a processor (or a controller).

The computer program instructions may alternatively be loaded onto the computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to them without departing from the scope of this application. Correspondingly, the specification and the accompanying drawings are merely example descriptions of this application defined by the accompanying claims, and are considered as any of or all modifications, variations, combinations or equivalents that cover the scope of this application.

It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A motor drive system, comprising:
a plurality of bridge arms;
a motor; and
a controller;
wherein each bridge arm of the plurality of bridge arms comprises a first switch and a second switch, a first end of the first switch is coupled to a first electrode of a power battery, a second end of the first switch is coupled to a first end of the second switch, and a second end of the second switch is coupled to a second electrode of the power battery;
wherein the motor comprises a plurality of windings, the plurality of windings are in one-to-one correspondence with the plurality of bridge arms, a first end of each winding of the plurality of windings is coupled to a common endpoint, and a second end of each winding of the plurality of windings is coupled to a second end of a first switch in a corresponding bridge arm;
wherein a second end of a first switch in a first bridge arm in the plurality of bridge arms is coupled to a first electrode of a power supply, and a second electrode of the power supply is coupled to the power battery; and
wherein the controller is configured to:
obtain a rotor position angle of the motor; and
control a bridge arm other than the first bridge arm in the plurality of bridge arms in a control manner corresponding to the rotor position angle, to enable the power supply to charge the power battery, wherein the control manner corresponding to the rotor position angle is based on a preset relationship between a position angle set and a control manner, the relationship between a position angle set and a control manner comprises a correspondence between different position angle sets and different control manners, and each position angle set comprises one or more position angles.

2. The motor drive system according to claim 1,
wherein the control manner comprises one of a parallel in-phase control manner, a parallel interleaved control manner, or a series control manner;
wherein the controller controlling the bridge arm other than the first bridge arm in the plurality of bridge arms comprises:
controlling main switches in two bridge arms other than the first bridge arm in the plurality of bridge arms to be periodically in a turn-on state at a same turn-on start moment and a same turn-on end moment based on the control manner corresponding to the rotor position angle being the parallel in-phase control manner; or
controlling main switches in two bridge arms other than the first bridge arm in the plurality of bridge arms to be periodically in a turn-on state at different turn-on start moments and/or different turn-on end moments based on the control manner corresponding to the rotor position angle being the parallel interleaved control manner; or
controlling a main switch in any bridge arm other than the first bridge arm in the plurality of bridge arms to be periodically in a turn-on state based on the control manner corresponding to the rotor position angle being the series control manner; and
wherein:
based on the second electrode of the power supply being coupled to the first electrode of the power battery, the main switch is the first switch; or
based on the second electrode of the power supply being coupled to the second electrode of the power battery, the main switch is the second switch.

3. The motor drive system according to claim 2, wherein the control manner corresponding to the rotor position angle is the parallel interleaved control manner, and the controller is further configured to:
adjust turn-on duration of a main switch in at least one of the two bridge arms, to change a current proportion in windings that are separately coupled to the two bridge arms.

4. The motor drive system according to claim 1, wherein the relationship between a position angle set and a control manner is based on at least one of the following:
a torque of the motor obtained when the controller controls a bridge arm other than the first bridge arm in the plurality of bridge arms in each of the different control manners in any position angle in the position angle set; or
a loss of the motor obtained when the controller controls a bridge arm other than the first bridge arm in the plurality of bridge arms in each of the different control manners in any position angle in the position angle set.

5. The motor drive system according to claim 1, wherein the controller is further configured to:
before obtaining the rotor position angle of the motor, determine that a vehicle to which the motor drive system belongs is in a stop state or a parking state.

6. A charging method, applied to a motor drive system that includes a plurality of bridge arms and a motor, the method comprising:
obtaining a rotor position angle of the motor, wherein each bridge arm of the plurality of bridge arms comprises a first switch and a second switch, a first end of the first switch is coupled to a first electrode of a power battery, a second end of the first switch is coupled to a first end of the second switch, and a second end of the second switch is coupled to a second electrode of the power battery, wherein the motor comprises a plurality of windings, the plurality of windings are in one-to-one correspondence with the plurality of bridge arms, a first end of each winding of the plurality of windings is coupled to a common endpoint, and a second end of each winding of the plurality of windings is coupled to a second end of a first switch in a corresponding bridge arm, and wherein a second end of a first switch in a first bridge arm in the plurality of bridge arms is coupled to a first electrode of a power supply, and a second electrode of the power supply is coupled to the power battery; and controlling a bridge arm other than the first bridge arm in the plurality of bridge arms in a control manner corresponding to the rotor position angle, to enable the power supply to charge the power battery, wherein the control manner corresponding to the rotor position angle is based on a preset relationship between a position angle set and a control manner, the relationship between a position angle set and a control manner comprises a correspondence between different position angle sets and different control manners, and each position angle set comprises one or more position angles.

7. The method according to claim 6, wherein the control manner comprises one of a parallel in-phase control manner, a parallel interleaved control manner, or a series control manner;

wherein controlling the bridge arm other than the first bridge arm in the plurality of bridge arms comprises:

controlling main switches in two bridge arms other than the first bridge arm in the plurality of bridge arms to be periodically in a turn-on state at a same turn-on start moment and a same turn-on end moment based on the control manner corresponding to the rotor position angle being the parallel in-phase control manner; or controlling main switches in two bridge arms other than the first bridge arm in the plurality of bridge arms to be periodically in a turn-on state at different turn-on start moments and/or different turn-on end moments based on the control manner corresponding to the rotor position angle being the parallel interleaved control manner; or controlling a main switch in any bridge arm other than the first bridge arm in the plurality of bridge arms to be periodically in a turn-on state based on the control manner corresponding to the rotor position angle being the series control manner; and wherein:

based on the second electrode of the power supply being coupled to the first electrode of the power battery, the main switch is the first switch; or based on the second electrode of the power supply being coupled to the second electrode of the power battery, the main switch is the second switch.

8. The method according to claim 7, wherein the controlling the main switches in two bridge arms other than the first bridge arm in the plurality of bridge arms to be periodically in the turn-on state at different turn-on start moments and/or different turn-on end moments based on the control manner corresponding to the rotor position angle of the motor being the parallel interleaved control manner further comprises:

adjusting a turn-on duration of a main switch in at least one of the two bridge arms, to change a current proportion in windings that are separately coupled to the two bridge arms.

9. The method according to claim 6, wherein the relationship between a position angle set and a control manner is based on at least one of the following:

a torque of the motor obtained when a bridge arm other than the first bridge arm in the plurality of bridge arms is controlled in each of the different control manners in any position angle in the position angle set; or a loss of the motor obtained when a bridge arm other than the first bridge arm in the plurality of bridge arms is controlled in each of the different control manners in any position angle in the position angle set.

10. The method according to claim 6, wherein before the obtaining the rotor position angle of the motor, the method further comprises:

determining that a vehicle to which the motor drive system belongs is in a stop state or a parking state.

11. An electric vehicle comprising a motor drive system, wherein the motor drive system comprises a plurality of bridge arms, a motor, and a controller;

wherein each bridge arm of the plurality of bridge arms comprises a first switch and a second switch, a first end of the first switch is coupled to a first electrode of a power battery, a second end of the first switch is coupled to a first end of the second switch, and a second end of the second switch is coupled to a second electrode of the power battery;

wherein the motor comprises a plurality of windings, the plurality of windings are in one-to-one correspondence with the plurality of bridge arms, a first end of each winding of the plurality of windings is coupled to a common endpoint, and a second end of each winding of the plurality of windings is coupled to a second end of a first switch in a corresponding bridge arm;

wherein a second end of a first switch in a first bridge arm in the plurality of bridge arms is coupled to a first electrode of a power supply, and a second electrode of the power supply is coupled to the power battery; and wherein the controller is configured to:

obtain a rotor position angle of the motor; and control a bridge arm other than the first bridge arm in the plurality of bridge arms in a control manner corresponding to the rotor position angle, to enable the power supply to charge the power battery, wherein the control manner corresponding to the rotor position angle is based on a preset relationship between a position angle set and a control manner, the relationship between a position angle set and a control manner comprises a correspondence between different position angle sets and different control manners, and each position angle set comprises one or more position angles.

12. The electric vehicle according to claim 11, wherein the control manner comprises one of a parallel in-phase control manner, a parallel interleaved control manner, or a series control manner;

wherein the controller controlling the bridge arm other than the first bridge arm in the plurality of bridge arms comprises:

controlling main switches in two bridge arms other than the first bridge arm in the plurality of bridge arms to be periodically in a turn-on state at a same turn-on start moment and a same turn-on end moment based on the control manner corresponding to the rotor position angle being the parallel in-phase control manner; or controlling main switches in two bridge arms other than the first bridge arm in the plurality of bridge arms to be periodically in a turn-on state at different turn-on start moments and/or different turn-on end moments based on the control manner corresponding to the rotor position angle being the parallel interleaved control manner; or controlling a main switch in any bridge arm other than the first bridge arm in the plurality of bridge arms to be periodically in a turn-on state based on the control manner corresponding to the rotor position angle being the series control manner; and wherein:

based on the second electrode of the power supply being coupled to the first electrode of the power battery, the main switch is the first switch; or based on the second electrode of the power supply being coupled to the second electrode of the power battery, the main switch is the second switch.

13. The electric vehicle according to claim 12, wherein the control manner corresponding to the rotor position angle is the parallel interleaved control manner, and the controller is further configured to:

adjust turn-on duration of a main switch in at least one of the two bridge arms, to change a current proportion in windings that are separately coupled to the two bridge arms.

14. The electric vehicle according to claim 11, wherein the relationship between a position angle set and a control manner is based on at least one of the following:

a torque of the motor obtained when the controller controls a bridge arm other than the first bridge arm in the plurality of bridge arms in each of the different control manners in any position angle in the position angle set; or a loss of the motor obtained when the controller controls a bridge arm other than the first bridge arm in the plurality of bridge arms in each of the different control manners in any position angle in the position angle set.

15. The electric vehicle according to claim 11, wherein the controller is further configured to:

before obtaining the rotor position angle of the motor, determine that a vehicle to which the motor drive system belongs is in a stop state or a parking state.

* * * * *